United States Patent
Papadopoulos et al.

(10) Patent No.: US 11,402,116 B2
(45) Date of Patent: Aug. 2, 2022

(54) SYSTEMS AND METHODS FOR INTERVENTION CONTROL IN A BUILDING MANAGEMENT SYSTEM

(71) Applicant: Johnson Controls Technology Company, Auburn Hills, MI (US)

(72) Inventors: Dimitrios S. Papadopoulos, Westwood, NJ (US); Kirk H. Drees, Cedarburg, WI (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 109 days.

(21) Appl. No.: 16/795,197

(22) Filed: Feb. 19, 2020

(65) Prior Publication Data

US 2021/0240147 A1     Aug. 5, 2021

Related U.S. Application Data

(60) Provisional application No. 62/968,866, filed on Jan. 31, 2020.

(51) Int. Cl.
*F24F 11/52*     (2018.01)
*G05B 13/02*     (2006.01)
(Continued)

(52) U.S. Cl.
CPC ............... *F24F 11/52* (2018.01); *F24F 11/30* (2018.01); *F24F 11/56* (2018.01); *F24F 11/58* (2018.01);
(Continued)

(58) Field of Classification Search
CPC .. F24F 11/30; F24F 11/52; F24F 11/56; F24F 11/58; F24F 11/61; F24F 11/64; F24F 11/65; F24F 2110/10; F24F 2110/20; F24F 2120/12; F24F 2120/20; F24F 2140/60; G05B 13/024; G05B 13/0265;
(Continued)

(56) References Cited

U.S. PATENT DOCUMENTS 9,299,029 B1 *    3/2016    Kim ..................... G06N 5/022
10,177,930 B1      1/2019    Bodkin et al.
(Continued)

OTHER PUBLICATIONS

U.S. Appl. No. 16/549,656, filed Aug. 23, 2019, Johnson Controls Technology Company.
(Continued)

*Primary Examiner* — Kidest Bahta
(74) *Attorney, Agent, or Firm* — Foley & Lardner LLP

(57) ABSTRACT

A method of predicting a time of effect of an intervention of a point of a Building Management System (BMS). The method includes evaluating a first input to determine how an intervention of a point will affect a variable of the BMS; predicting a time at which the intervention will affect the variable of the BMS; presenting feedback to a user via a user interface before implementing the intervention of the point, the feedback comprising the time at which the intervention of the point is predicted to affect the variable; and implementing the intervention or a cancellation of the intervention based at least in part on a second input from the user or an automated response to the feedback. The method allows for users to determine whether to implement proposed interventions in real-time.

20 Claims, 12 Drawing Sheets

(51) Int. Cl.

| | | |
|---|---|---|
| *F24F 11/65* | (2018.01) | |
| *G06Q 20/10* | (2012.01) | |
| *F24F 11/58* | (2018.01) | |
| *F24F 11/64* | (2018.01) | |
| *F24F 11/30* | (2018.01) | |
| *F24F 11/56* | (2018.01) | |
| *F24F 11/61* | (2018.01) | |
| *G05B 13/04* | (2006.01) | |
| *F24F 110/20* | (2018.01) | |
| *F24F 140/60* | (2018.01) | |
| *F24F 120/20* | (2018.01) | |
| *F24F 120/12* | (2018.01) | |
| *F24F 110/10* | (2018.01) | |

(52) U.S. Cl.
CPC .............. *F24F 11/61* (2018.01); *F24F 11/64* (2018.01); *F24F 11/65* (2018.01); *G05B 13/024* (2013.01); *G05B 13/0265* (2013.01); *G05B 13/048* (2013.01); *G06Q 20/102* (2013.01); *F24F 2110/10* (2018.01); *F24F 2110/20* (2018.01); *F24F 2120/12* (2018.01); *F24F 2120/20* (2018.01); *F24F 2140/60* (2018.01)

(58) Field of Classification Search
CPC .................. G05B 13/048; G05B 15/02; G05B 2219/2614; G06Q 20/102
See application file for complete search history.

(56) References Cited

U.S. PATENT DOCUMENTS

| | | |
|---|---|---|
| 2011/0184565 A1* | 7/2011 | Peterson ................ G06Q 30/00 700/278 |
| 2015/0308708 A1 | 10/2015 | Harada et al. |
| 2016/0018832 A1 | 1/2016 | Frank et al. |
| 2018/0306459 A1 | 10/2018 | Turney |
| 2018/0313557 A1* | 11/2018 | Turney .................... F24F 11/64 |
| 2018/0364654 A1 | 12/2018 | Locke et al. |
| 2018/0372363 A1 | 12/2018 | Park et al. |
| 2019/0041811 A1 | 2/2019 | Drees |
| 2019/0123931 A1 | 4/2019 | Schuster et al. |
| 2019/0293494 A1 | 9/2019 | Mao et al. |
| 2019/0338973 A1 | 11/2019 | Turney et al. |
| 2019/0338974 A1 | 11/2019 | Turney et al. |
| 2019/0338977 A1 | 11/2019 | Turney et al. |
| 2019/0353377 A1 | 11/2019 | Mao et al. |
| 2019/0353775 A1 | 11/2019 | Kirsch et al. |
| 2019/0354071 A1 | 11/2019 | Turney et al. |
| 2019/0377305 A1* | 12/2019 | Petrus .................. G05B 13/0265 |
| 2019/0378020 A1 | 12/2019 | Camilus et al. |
| 2019/0384239 A1 | 12/2019 | Murugesan et al. |

OTHER PUBLICATIONS

U.S. Appl. No. 16/549,744, filed Aug. 23, 2019, Johnson Controls Technology Company.
U.S. Appl. No. 16/549,037, filed Aug. 23, 2019, Johnson Controls Technology Company.
U.S. Appl. No. 16/598,635, filed Oct. 10, 2019, Johnson Controls Technology Company.

* cited by examiner

Historical Database

| ID | Timestamp | Value | Comfortability | Energy Consumption (kWh) | Semantic Data |
|---|---|---|---|---|---|
| GUID: 07u615248 | 2018-08-31T15:10:00 | 180 | 100% | 1.5 | Hot Water Supply Temperature |
| GUID: 08u325627 | 2017-06-23T07:07:00 | ON | 90% | 1.6 | Supply Fan Status |
| GUID: 01u213458 | 2016-03-15T23:10:00 | 70 | 90% | 1.4 | Zone Air Temperature |
| GUID: 08u325627 | 2019-03-10T09:10:00 | OFF | 15% | 0 | Supply Fan Status |
| GUID: 01u213458 | 2017-02-14T07:13:00 | 85 | 20% | 1.8 | Zone Air Temperature |
| GUID: 13u876521 | 2019-07-07T14:05:00 | 40 | 100% | 1.9 | Chiller Water Supply Temperature |
| GUID: 07u615248 | 2013-04-23T15:07:00 | 170 | 95% | 1.5 | Hot Water Supply Temperature |
| GUID: 18u567894 | 2016-08-31T23:10:00 | 65 | 60% | 1.4 | Discharge Air Temperature |

External Loading Disturbances Timeseries

| Timestamp | Outdoor Air Temperature (Fahrenheit) | Outdoor Air Humidity | Sun Exposure (Heat gain coefficients) | Heat Load (BTU/h) |
|---|---|---|---|---|
| 2015-12-31T01:00:00 | 23 | 80% | .1 | 43,000 |
| 2015-12-31T02:00:00 | 23 | 79% | .15 | 42,500 |
| 2015-12-31T03:00:00 | 24 | 76% | .17 | 42,000 |
| 2015-12-31T04:00:00 | 25 | 75% | .2 | 43,500 |
| 2015-12-31T05:00:00 | 25 | 75% | .4 | 43,250 |
| 2015-12-31T06:00:00 | 27 | 74% | .5 | 43,200 |
| 2015-12-31T07:00:00 | 28 | 73% | .6 | 42,500 |
| 2015-12-31T08:00:00 | 30 | 71% | .7 | 42,000 |

FIG. 7

Internal Loading Disturbances Timeseries

| Timestamp | Space Occupancy | Zone Air Temperature (Fahrenheit) | Zone Air Temperature Setpoint (Fahrenheit) | Internal Heat Load (BTU/h) | Equipment Cooling Load (BTU/h) |
|---|---|---|---|---|---|
| 2015-12-31T01:00:00 | 5 | 70 | 70 | 35,320 | 20,600 |
| 2015-12-31T02:00:00 | 7 | 71 | 70 | 33,120 | 20,100 |
| 2015-12-31T03:00:00 | 8 | 70 | 70 | 37,000 | 21,000 |
| 2015-12-31T04:00:00 | 8 | 69 | 70 | 31,586 | 19,000 |
| 2015-12-31T05:00:00 | 9 | 70 | 70 | 40,154 | 22,000 |
| 2015-12-31T06:00:00 | 11 | 71 | 70 | 42,854 | 23,000 |
| 2015-12-31T07:00:00 | 12 | 72 | 70 | 44,520 | 24,500 |
| 2015-12-31T08:00:00 | 12 | 70 | 70 | 43,720 | 24,500 |

FIG. 8

Intervention Timeseries

| Timestamp | Heat Load (BTU/h) | Equipment Cooling Load | Cooling Coil Valve Position | ZN-T (Fahrenheit) | Energy Consumption (kWh) | Comfortability |
|---|---|---|---|---|---|---|
| 2015-12-31T01:00:00 | 43,000 | 20,600 | 50% | 75 | 1.5 | 75% |
| 2015-12-31T02:00:00 | 42,500 | 20,100 | 50% | 75 | 1.6 | 75% |
| 2015-12-31T03:00:00 | 42,000 | 21,000 | 100% | 74 | 1.7 | 85% |
| 2015-12-31T04:00:00 | 43,500 | 19,000 | 100% | 72 | 1.8 | 90% |
| 2015-12-31T05:00:00 | 43,250 | 22,000 | 100% | 70 | 1.9 | 95% |
| 2015-12-31T06:00:00 | 43,200 | 23,000 | 100% | 67 | 2.0 | 80% |
| 2015-12-31T07:00:00 | 42,500 | 24,500 | 100% | 65 | 2.2 | 70% |
| 2015-12-31T08:00:00 | 42,000 | 24,500 | 100% | 63 | 2.3 | 50% |

FIG. 9

Non-Intervention Timeseries

| Timestamp | Heat Load (BTU/h) | Equipment Cooling Load | Cooling Coil Valve Position | ZN-T (Fahrenheit) | Energy Consumption (kWh) | Comfortability |
|---|---|---|---|---|---|---|
| 2015-12-31T01:00:00 | 43,000 | 20,600 | 50% | 75 | 1.5 | 75% |
| 2015-12-31T02:00:00 | 42,500 | 20,100 | 50% | 75 | 1.6 | 75% |
| 2015-12-31T03:00:00 | 42,000 | 21,000 | 50% | 75 | 1.7 | 75% |
| 2015-12-31T04:00:00 | 43,500 | 19,000 | 50% | 75 | 1.2 | 75% |
| 2015-12-31T05:00:00 | 43,250 | 22,000 | 50% | 75 | 1.8 | 75% |
| 2015-12-31T06:00:00 | 43,200 | 23,000 | 50% | 75 | 1.9 | 75% |
| 2015-12-31T07:00:00 | 42,500 | 24,500 | 50% | 75 | 2.0 | 75% |
| 2015-12-31T08:00:00 | 42,000 | 24,500 | 50% | 75 | 2.0 | 75% |

FIG. 10

SYSTEMS AND METHODS FOR INTERVENTION CONTROL IN A BUILDING MANAGEMENT SYSTEM

CROSS-REFERENCE TO RELATED APPLICATIONS

This application claims the benefit of and priority to U.S. Provisional patent Application No. 62/968,866 filed Jan. 31, 2020, the entirety of which is incorporated by reference herein.

BACKGROUND

The present disclosure relates generally to the field of building management systems and more particularly to intervention control in a building management system (BMS). A BMS is, in general, a system of devices configured to control, monitor, and manage equipment in or around a building or building area. A BMS can include, for example, a heating, ventilating, or air conditioning (HVAC) system, a security system, a lighting system, a fire alerting system, another system capable of managing building functions or devices, or any combination thereof.

Building management systems have a wide variety of points that often impact other points of the building management system. For example, a position of a point, such as, a cooling coil valve in an HVAC system, may impact the zone air temperature of a room or space. Often, occupants of building management systems wish to change the configurations of one or more points so they can be more comfortable. To do so, the occupants may perform operator interventions on the control system of the building management system to temporarily change their surrounding environment. For example, occupants may lower the zone air temperature setpoint of a room when they feel too hot. Unfortunately, these manual interventions are often forgotten, leaving the changes in place indefinitely until an operator reverts the intervention. Consequently, points may enter an undesirable range of values such as the temperature of a space getting too hot/cold or the energy consumption of the BMS increasing to an undesirable level.

SUMMARY

In one implementation of the present disclosure, a method of predicting a time of effect of an intervention of a point of a Building Management System (BMS) is provided. The method includes predicting a time at which an intervention of a point will affect a variable of the BMS; presenting feedback to a user via a user interface before implementing the intervention of the point, the feedback including the time at which the intervention of the point is predicted to affect the variable; and implementing the intervention or a cancellation of the intervention based at least in part on an input from the user or an automated response to the feedback.

In some embodiments, the method includes obtaining a range of acceptable values of the variable. Predicting the time at which the intervention will affect the variable includes determining a time at which the intervention will cause a value of the variable to be within the range of acceptable values of the variable.

In some embodiments, the method further includes determining a time at which the intervention will cause a second value of the variable to be outside of the range of acceptable values of the variable.

In some embodiments, predicting the time at which the intervention will affect the variable of the BMS includes obtaining live BMS data associated with operation of the BMS; providing the live BMS data to one or more machine learning models; obtaining a confidence score from the one or more machine learning models as to the time at which the intervention will affect the variable of the BMS; and predicting the time at which the intervention will affect the variable of the BMS based on the confidence score.

In some embodiments, the method further includes generating a training dataset using historical data associated with the BMS, the training dataset including timeseries with an output indicating a second time that a second intervention will affect the variable; and training the one or more machine learning models using the training dataset.

In some embodiments, the one or more machine learning models include at least one selected from a group of a first machine learning model for predicting control system data if there is not an intervention; and a second machine learning model for predicting control system data if there is an intervention; wherein predicting a time at which the intervention will affect the variable of the BMS is based on an output from the second machine learning model.

In some embodiments, the one or more machine leaning models further include at least one selected from a group of a third machine learning model for predicting an effect that external loading disturbances will have on the BMS; and a fourth machine learning model for predicting an effect that internal loading disturbances will have on the BMS. Each of the third machine learning model and the fourth machine learning model may provide outputs to each of the first machine learning model and the second machine learning model.

In some embodiments, the method further includes presenting, on the user interface, a time range at which an intervention would provide an occupant with a highest comfortability; or presenting, on the user interface, a second time range at which an intervention would provide for a highest energy savings or a highest cost savings.

In some embodiments, the method further includes presenting, on the user interface, first values of the variable over time if the user does not input the intervention and second values of the variable over time if the user does input the intervention.

In some embodiments, the variable is an energy consumption, a zone air temperature, a zone humidity, or a discharge air temperature.

In some embodiments, the point is a supply vent state, a supply fan state, a discharge air temperature setpoint, a zone air temperature setpoint, a ductwork damper state, or a cooling coil valve position.

In another implementation of the present disclosure, a system including one or more memory devices storing instructions thereon that, when executed by one or more processors, cause the one or more processors to receive a first input related to an intervention of a point; predict a time at which the intervention will affect a variable of the system; and implement the intervention or a cancellation of the intervention based at least in part on the time.

In some embodiments, the instructions cause the one or more processors to further obtain a range of acceptable values of the variable. Predicting the time at which the intervention will affect the variable may include determining a time at which the intervention will cause a value of the variable to be within the range of acceptable values of the variable.

In some embodiments, the instructions cause the one or more processors to further determine a time at which the intervention will cause a second value of the variable to be outside of the range of acceptable values of the variable.

In some embodiments, the instructions cause the one or more processors to predict the time at which the intervention will affect the variable of the system includes obtaining live system data associated with operation of the system; providing the live system data to one or more machine learning models; obtaining a confidence score from the one or more machine learning models as to the time at which the intervention will affect the variable of the system; and predicting the time at which the intervention will affect the variable of the system based on the confidence score.

In some embodiments, the instructions cause the one or more processors to further generate a training dataset using historical data associated with the system, the training dataset including timeseries with an output indicating a second time at which a second intervention will affect the variable; and train the one or more machine learning models using the training dataset.

In yet another implementation of the present disclosure, a method of predicting a time of effect of an intervention of a point of a Building Management System (BMS) is provided. The method may include predicting a time at which an intervention of a point will cause a value of a variable to be outside of an acceptable range of values; presenting feedback to a user via a user interface before implementing the intervention of the point, the feedback including the time at which the intervention will cause the value of the variable to be outside of the acceptable range of values; and implementing the intervention, a modification of the intervention, or a cancellation of the intervention based at least in part on an input from the user or an automated response to the feedback.

In some embodiments, predicting the time at which the intervention will affect the variable of the BMS includes obtaining live BMS data associated with operation of the BMS; providing the live BMS data to one or more machine learning models; obtaining a confidence score from the one or more machine learning models as to the time at which the intervention cause the value of the variable to be outside of the acceptable range of values; and predicting the time at which the intervention will cause the value of the variable to be outside of the acceptable range of values based on the confidence score.

In some embodiments, the one or more machine learning models include at least one selected from a group of a first machine learning model for predicting control system data if there is not an intervention; and a second machine learning model for predicting control system data if there is an intervention. Predicting a time at which the intervention will affect the variable of the BMS may be based on an output from the second machine learning model.

In some embodiments, the one or more machine learning models include at least one selected from a group of a third machine learning model for predicting an effect that external loading disturbances will have on the BMS; and a fourth machine learning model for predicting an effect that internal loading disturbances will have on the BMS. Each of the third machine learning model and the fourth machine learning model may provide outputs to each of the first machine learning model and the second machine learning model.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 6 is a table showing an example of historical data in a database associated with the intervention prediction system of FIG. 5, according to some embodiments.

FIG. 7 is a table showing an example of timeseries data in a training dataset associated with external loading disturbances, according to some embodiments.

FIG. 8 is a table showing an example of timeseries data in a training dataset associated with internal loading disturbances, according to some embodiments.

FIG. 9 is a table showing an example of timeseries data in a training dataset associated with an intervention, according to some embodiments.

FIG. 10 is a table showing an example of timeseries data in a training dataset associated with non-intervention, according to some embodiments.

DETAILED DESCRIPTION

Overview

Referring generally to the FIGURES, systems and methods for predicting the effects that an intervention of the configurations of one point of a building management system (BMS) will have on another point or variable of the BMS are shown, according to various embodiments. The BMS is configured to receive an input from an operator or from a controller indicating to change a point of a BMS and automatically determine the impact such a change will have. The BMS may display the determined impact on a user interface and/or automatically determine whether to implement the change. The user interface may show predicted comfortability scores, predicted energy consumption values, and predicted values of other points of the BMS if the change were to be implemented. Users can view the values and determine whether to implement the change through the same user interface. This functionality allows users to easily assess whether to change the operation of the BMS. The functionality may warn users of any dangers that implementing such changes to the BMS system may cause and indicate any benefits the changes may have. In some embodiments, these systems and methods advantageously allow the BMS to avoid entering undesirable states.

Advantageously, the presently disclosed embodiments provide for a method for automatically determining the impact that an intervention may have if an intervention is put into effect. The method may include predicting times for which the intervention would likely have a positive and/or a negative impact on a point or variable of a BMS. The predicted times may be displayed on a user interface that allows operators to view the impact that implementing the intervention will have and determine whether to follow through with the intervention. Operators may use the times shown on the interface to override the normal state of the BMS for a set time period before returning to the normal state. In some embodiments, the predicted times are used to automatically determine whether to implement the intervention without a user input. By determining the impact that an intervention may have on various points of a BMS, operators and/or control systems may more easily determine the positive and negative impacts that interventions may have.

Building Management System and HVAC System

Figure 1:
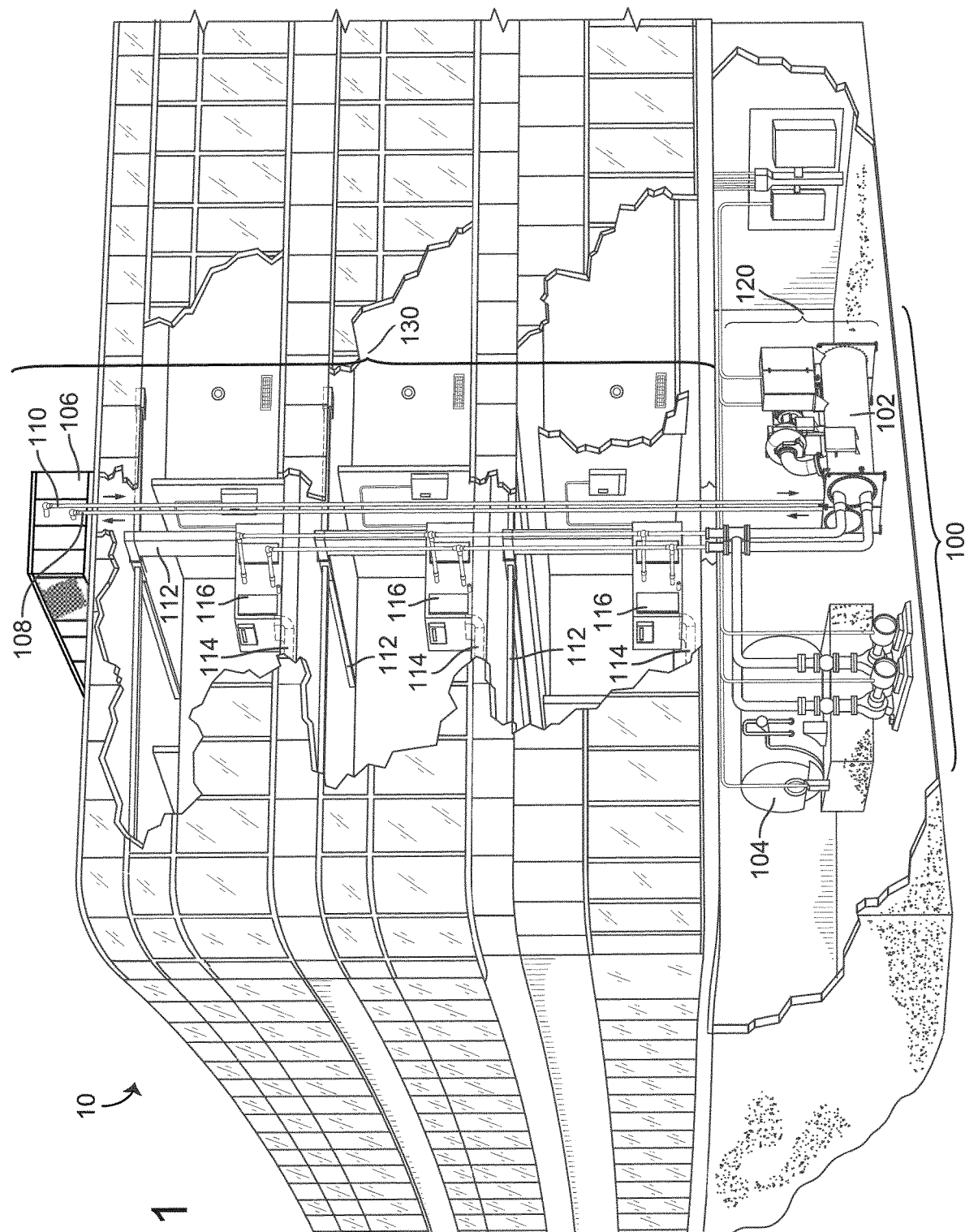
FIG. 1 is a drawing of a building equipped with a heating, ventilating, and/or air conditioning (HVAC) system and a building management system (BMS), according to some embodiments.

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., boilers, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
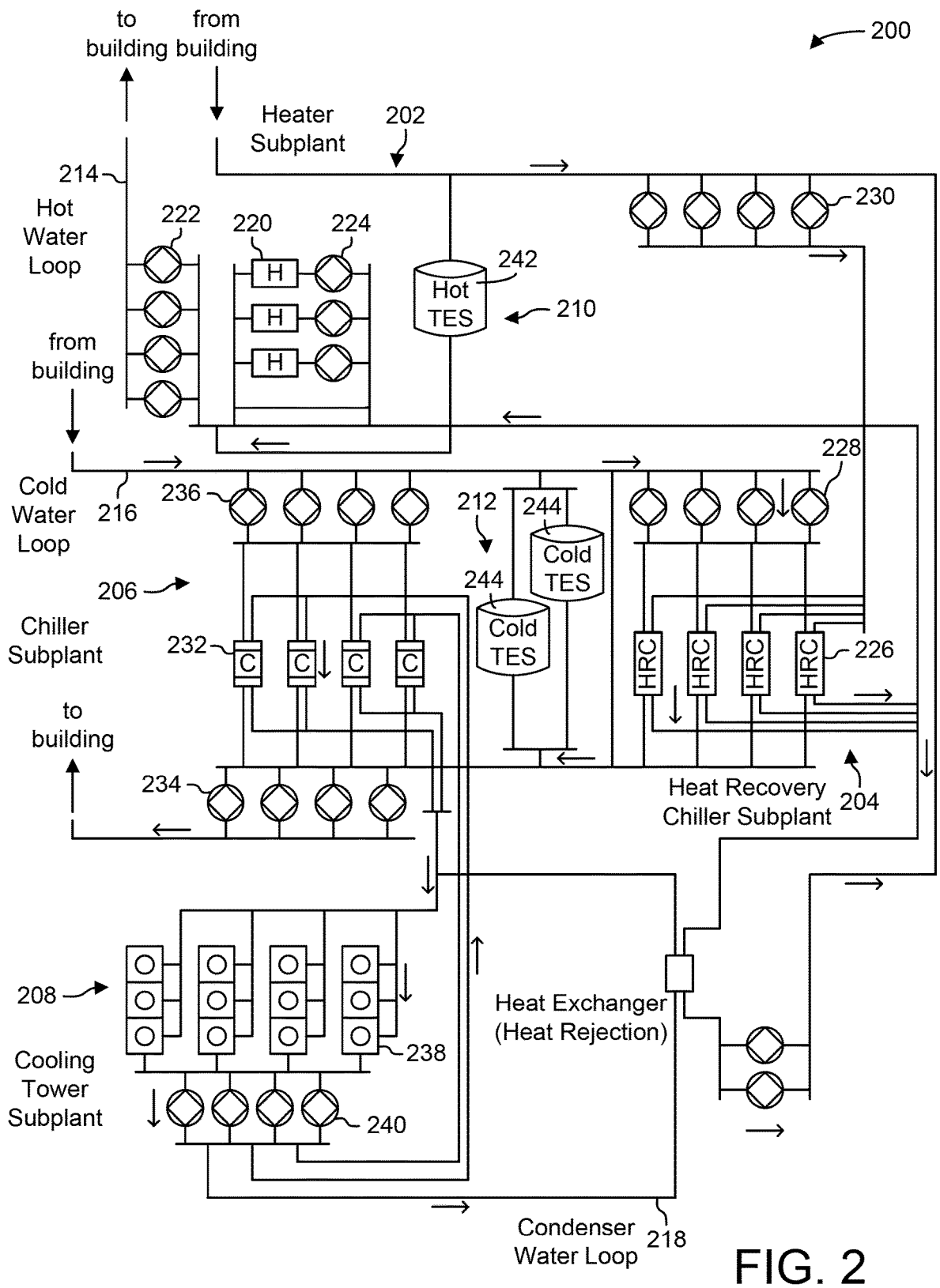
FIG. 2 is a schematic diagram of a waterside system which may be used to support the HVAC system of FIG. 1, according to some embodiments.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
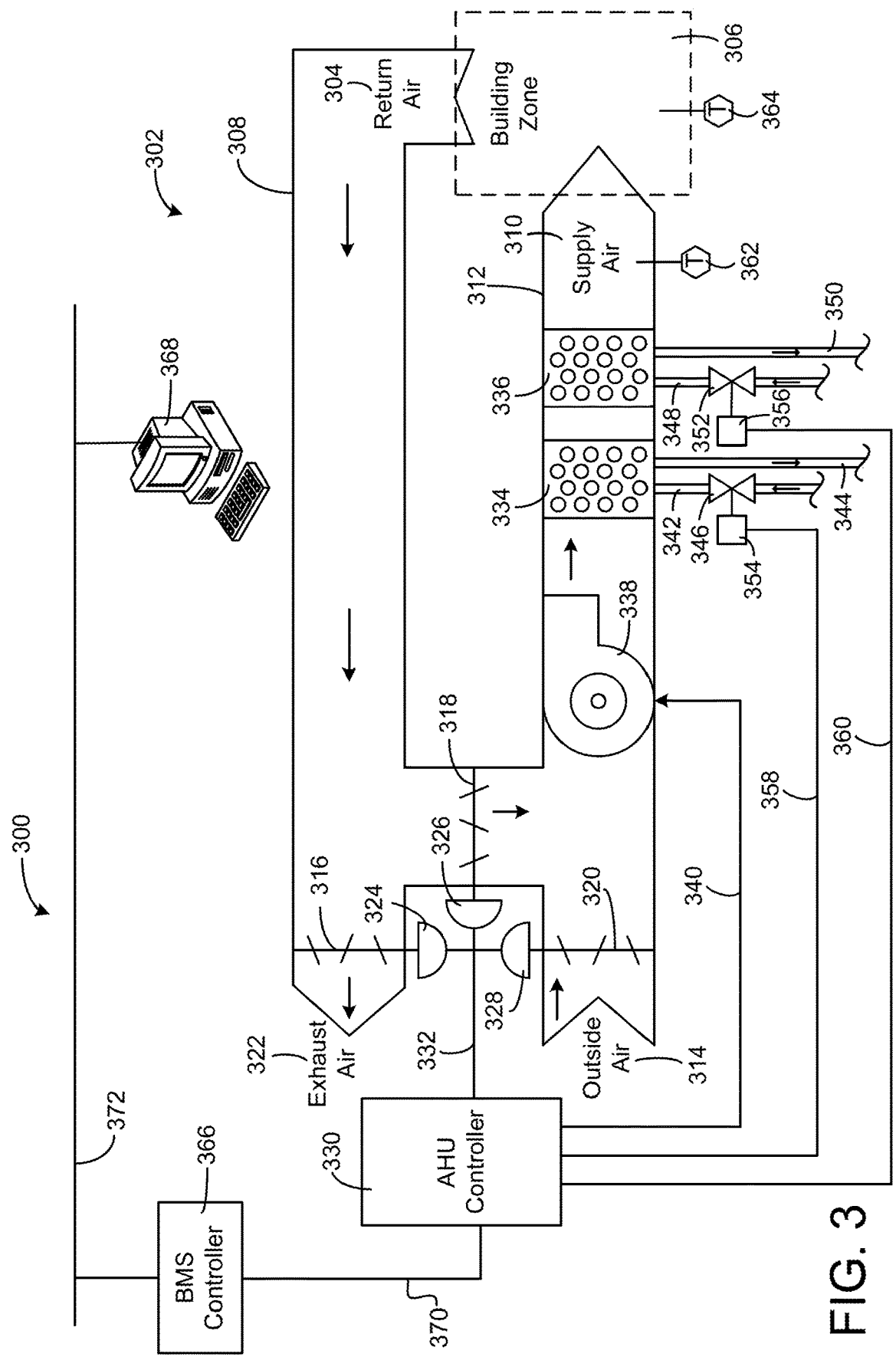
FIG. 3 is a block diagram of an airside system which may be used as part of the HVAC system of FIG. 1, according to some embodiments.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
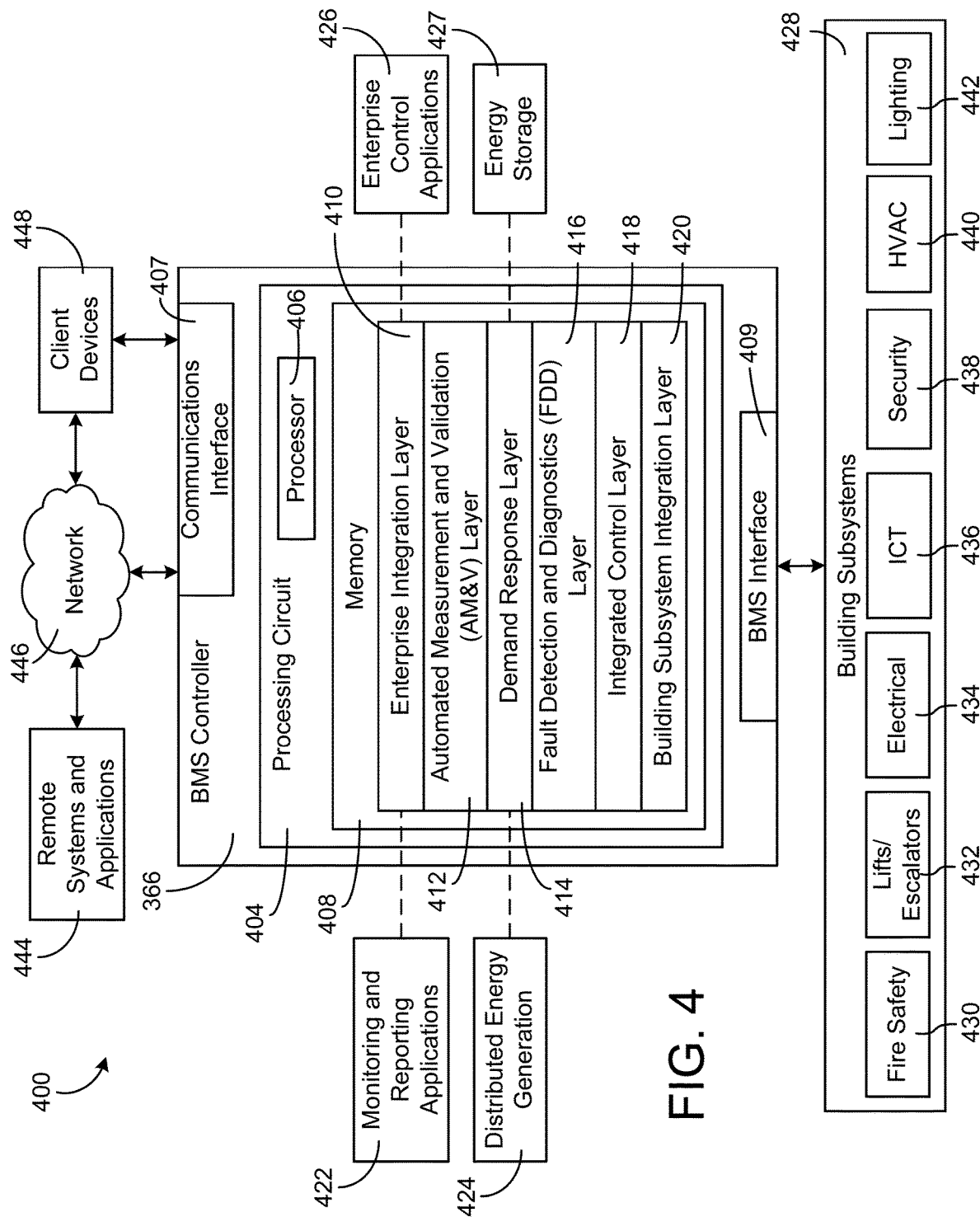
FIG. 4 is a block diagram of a BMS which may be implemented in the building of FIG. 1, according to some embodiments.

Referring now to FIG. 4, a block diagram of a BMS 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a WiFi transceiver for communicating via a wireless communications network. In another example, one or both of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Building Management System with Intervention Prediction

Figure 5:
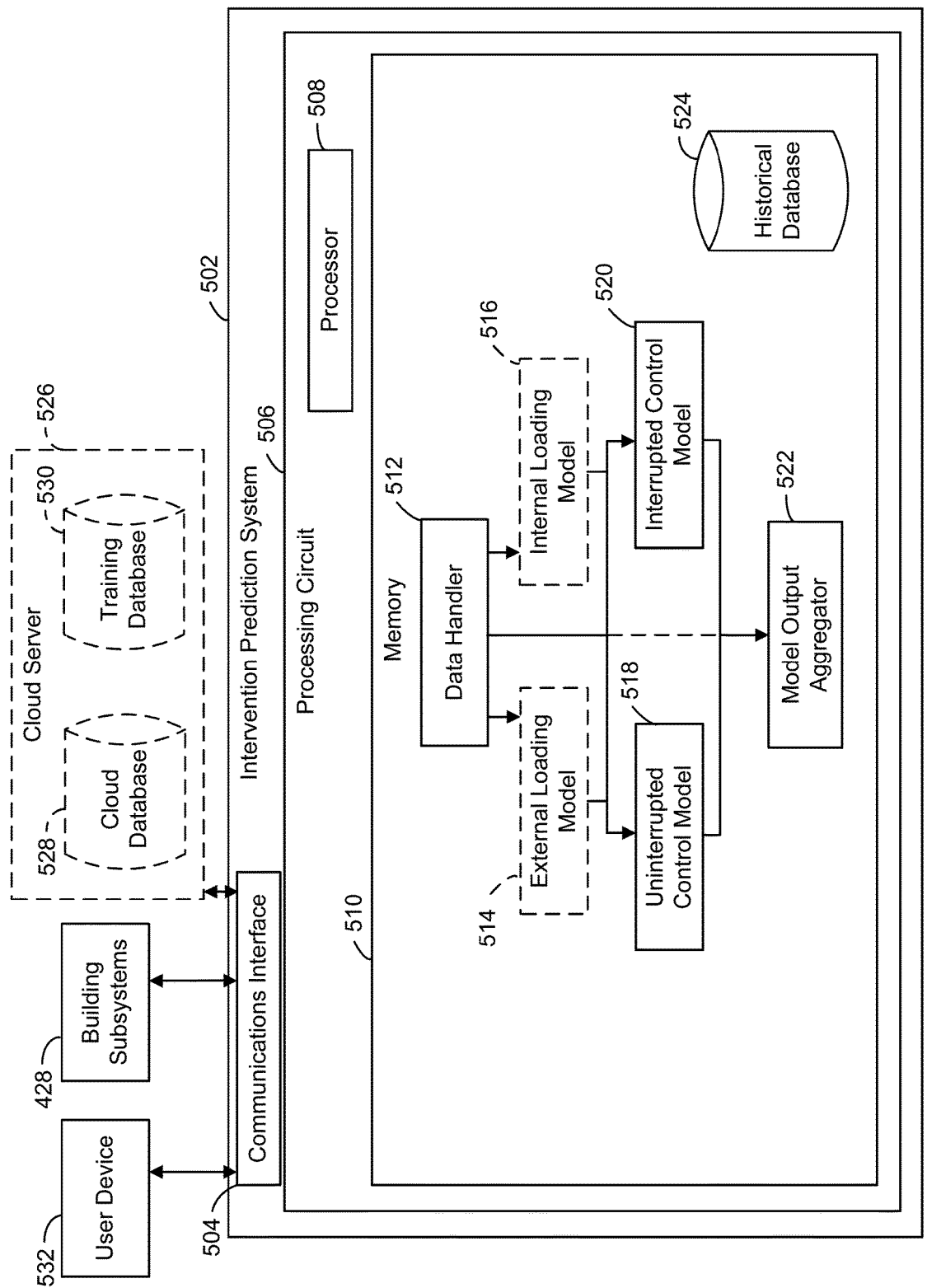
FIG. 5 is a block diagram of an example intervention prediction system associated with the BMS of FIG. 4, according to some embodiments.

Referring now to FIG. 5, a block diagram of an intervention prediction system 502 associated with BMS 400 is shown, according to some embodiments. Intervention prediction system 502 can generally be configured to receive building data from building equipment associated with BMS 400 and a desired intervention of a point of BMS 400 and generate a user interface showing an impact that the desired intervention of the point may have on another point or variable of BMS 400. An intervention may be a change to a point from how the point is generally configured to operate. Intervention prediction system 502 may also determine whether to automatically implement an intervention.

As used herein, "points" or "data points" refer to sensor inputs, control outputs, control values, and/or different characteristics of the inputs and/or outputs. "Points" and/or "data points" may refer to various data objects relating to the inputs and the outputs such as BACnet objects. The objects may represent and/or include a point and/or group of points. The object may include various properties for each of the points. For example, an analog input may be a particular point represented by an object with one or more properties describing the analog input and another property describing the sampling rate of the analog input. For example, in some embodiments, a point is a data representation associated with a component of a BMS, such as, a camera, thermostat, controller, VAV box, RTU, valve, damper, chiller, boiler, AHU, supply fan, etc.

Intervention prediction system 502 includes a processing circuit 506 including a processor 508 and a memory 510. Memory 510 can include instructions which, when executed by processor 508, cause processor 508 to perform the one or more operations described herein. Each of the processes and services conducted by intervention prediction system 502 can also be conducted by BMS controller 366 and/or other similar components. For example, intervention prediction system 502 may generally be implemented using one or more servers or mobile devices associated with BMS 400 and can be distributed across a multitude of computing components. The one or more servers may be remote servers (cloud), local servers (on-premises), or any combination thereof. Processor 508 as described herein may be implemented using one or more processors or processing devices such as a tensor processing unit (TPU) designed for using machine learning techniques to predict an impact that implementing an intervention will have on BMS 400.

Memory 510 can be configured to store instructions executable by control circuitry and/or other data (e.g., data pertaining to communication, configuration and/or address data of nodes, etc.). Processing circuit 506 can be configured to implement any of the methods described herein and/or to cause such methods to be performed by a processor (e.g., processor 508). Memory 510 includes instructions for a data handler 512, an external loading model 514, an internal loading model 516, an uninterrupted control model 518, an interrupted control model 520, a model output aggregator 522, and a historical database 524. Memory 510 can include any number of components and/or modules. Processing circuit 506 can implement any of components 518-524 to receive an indication of an intervention input (from an operator or another device or system), automatically determine, in some cases to a level of confidence, the impact that implementing the intervention may have on BMS 400 over time, and, in some cases, implement the intervention according to a user input or automatically based on how intervention prediction system 502 is configured. It may be considered that processing circuit 506 includes or may be connected or connectable to memory 510, which may be configured to be accessible for reading and/or writing by BMS controller 366 and/or processing circuit 404. Further, components 512-522 of memory 510 can communicate with a user device 532 to receive and transmit data. User device 532 can be the same or similar to client device 368 as described with reference to FIG. 3.

Intervention prediction system 502 is shown to include a communications interface 504. Communications interface 504 can be configured to facilitate communication with any device. Furthermore, communications interface 504 can be configured to securely communicate with all of the devices and systems described with reference to FIG. 3. In various embodiments, communications via communications interface 504 can be direct (e.g., local wired or wireless communications) or via a communications network (e.g., a WAN, the Internet, a cellular network, etc.).

In some embodiments, intervention prediction system 502 may communicate with a cloud server 526. Cloud server 526 may include one or more servers implemented in a cloud environment. Cloud server 526 may be dedicated to storing and/or aggregating data for BMSs such as BMS 400. For example, cloud server 526 may include a dedicated back-up database (e.g., cloud database 534, described below) for data that is stored in intervention prediction system 502. Cloud server 526 is shown to include cloud database 528 and training database 530. Cloud database 534 may be a cloud database that collects and stores building data from subsystems 428 of BMS 400 and various other BMSs. Cloud database 534 may be configured to store building data similar to historical database 524, described below. Cloud database 534 may also collect and store various other types of data (e.g., weather data, utility consumption data, spatial information, facility mappings, social media content, etc.) that are associated with BMS 400. Data of cloud database 534 may be encrypted to protect the data from malicious entities. Advantageously, cloud database 534 may offer users a more expansive view of how BMS 400 operates under various conditions that may not be visible when only building data generated by devices or sensors of BMS 400 is available.

In some embodiments, training database 530 is a cloud database that is in communication with subsystems 428 of BMS 400 and with subsystems of other BMSs that are in communication with cloud server 526. Training database 530 may collect and store building data similar to cloud database 534 from each of such BMSs. The building data of training database 530 may include timeseries values similar to the building data of historical database 524. Such timeseries values may be used as training data to train any machine learning models implemented by BMS 400. By collecting and storing building data from multiple BMSs, training database 530 may enable users viewing the building data through a user interface to compare data of different BMSs and gain insights into how each BMS is operating and/or how each BMS could be operating. Further, training database 530 may unify metadata management of the building systems so building components and relationships of the building components can be described using consistent descriptions across different BMSs. For example, data of a temperature sensor that collects data associated with the outside air temperature of a building system may be tagged as an "OAT-Sensor" in training database 530. Data from outside air temperature sensors of other BMSs that provide data to training database 530 may be similarly tagged. Consequently, data from multiple BMSs may be more easily identified and used to train the machine learning models of intervention prediction system 502 to predict the impact that an intervention would likely have on a point or variable of BMS 400.

Advantageously, because training database 530 includes descriptions of values of points and values that are similar across BMSs, the data of training database 530 may be easier to aggregate to generate training data sets to train any machine learning models of BMS 400. Such machine learning models may be trained to predict the impact that an intervention may have on a point or variable of BMS 400 using large amounts of training data. Training may not be limited to using data from BMS 400, which could be limited in some instances. Consequently, the machine learning models may be trained to be more accurate and/or more quickly than if only data from BMS 400 were to be used for training.

BMS 400 may include historical database 524. Historical database 524 may be configured to store building data associated with BMS 400. Historical database 524 can be a graph database, MySQL, Oracle, Microsoft SQL, PostgreSql, DB2, document store, search engine, device identifier-value store, etc. Historical database 524 can be configured to hold data including any amount of values and can be made up of any number of components. The data can include various measurements and states (e.g., temperature readings, pressure readings, device state readings, blade speeds, etc.) associated with building equipment (e.g., AHUs, chillers, boilers, VAVs, fans, etc.) of each subsystem of building subsystems 428. In some embodiments, the building data is tagged with timestamps indicating times and/or dates that the values of the building data were generated by devices of building subsystems 428 and/or collected by various components of BMS 400. For example, historical database 524 may include timeseries data as described below. Data handler 512 may use the data stored in historical database 524 to train the machine learning models of external loading model 514, internal loading model 516, uninterrupted control model 518, and/or interrupted control model 520 to operate in tandem to predict the impact an intervention may have on a point or variable of BMS 400.

In some embodiments, historical database 524 stores prediction values or timeseries for points of BMS 400. The prediction values may be sourced from external data source providers (e.g., weather service providers that provide hourly and/or daily weather forecasts) or from an internal source of BMS 400. For example, BMS 400 may generate a normal state of operation model that includes expected values for various points of BMS 400 over time. Each predicted value may be associated with a time or time-step. Historical database 524 may include predicted values for times or time-steps in increments of seconds, minutes, hours, days, weeks, etc., or any other measurement of time. The predicted values may be related to external factors such as weather forecasts or internal factors such as the expected occupancy of BMS 400 over time.

Data handler 512 can be configured to retrieve and/or collect building data from BMS 400 and store the building data in historical database 524 of BMS 400, in some embodiments. Data handler 512 can be configured to collect data automatically from BMS 400 and store the data in historical database 524. In some embodiments, data handler 512 is configured to poll BMS 400 to collect data at predetermined time intervals set by an administrator. Data handler 512 can further be configured to collect data upon obtaining an indication that an operator provided an input to cause an intervention of a point of BMS 400. In some embodiments, data handler 512 is configured to collect building data upon receiving a request from an administrator. The administrator may make the request from a user device, such as user device 532. The administrator can request building data associated with any time period or building device. In some embodiments, data handler 512 may collect the data and transmit the data to historical database 524 for storage.

Data handler 512 can be configured to tag each data point of the data with timestamps indicating when the data point was generated and/or when data handler 512 collected the data from BMS 400 or building subsystems 428. In some embodiments, data handler 512 can also tag the data with a device identifier tag indicating from which building device the building data was collected. Data handler 512 can receive data from BMS 400 and/or devices of building subsystems 428, check the data for errors, and transfer the data to historical database 524 for storage. The data can be associated with one or more points (e.g., specific characteristics of BMS 400) over different time periods.

Data handler 512 can be configured to analyze data received from building subsystems 428 of BMS 400 to identify any errors in the data. Errors may occur at the bit level resulting from a faulty transmission (e.g., a bad read or write) between BMS 400 and components of intervention prediction system 502 or during transmission between any components of BMS 400. Errors may also result from faulty sensors of devices of building subsystems 428 that provide data to data handler 512. Data handler 512 can identify the errors and discard the faulty data. In some embodiments, data handler 512 can send an error message to user device 532 indicating that there is an error in the data and a device associated with the error may require attention from an administrator.

In some instances, data handler 512 can identify errors in the data based on whether the data is within a predetermined range of values. If the data includes values outside of the predetermined range of values, data handler 512 can determine that there is an error in the data and discard a portion of the data including the error or the dataset in which error is included. The predetermined ranges can be determined by an administrator and can be particular to different devices and/or measurements. For example, data handler 512 may receive data associated with the temperature of a conference room. An administrator may have determined that any data indicating that the temperature of the conference room is outside of a range from 60 to 80 degrees is received or generated in error and should be discarded. Data handler 512 can identify the range determined by the administrator and discard any data points that lie outside of the 60 to 80-degree range.

In some instances, data handler 512 may identify errors in data to a certain a level of confidence. Data handler 512 may determine the level of confidence based on how close values are to expected values or expected ranges. In some cases, for example, the closer the values are to the expected values or ranges, the higher the confidence score. Data handler 512 may compare these confidence scores to a threshold (e.g., a threshold determined by an administrator). Data handler 512 may discard any values that are associated with confidence scores that do not exceed the threshold as being received or generated in error. Data handler 512 may otherwise use and/or store any values that are associated with a confidence score that exceeds the threshold.

Advantageously, by discarding data that was likely received or generated in error, intervention prediction system 502 may not use faulty data to train machine learning models of external loading model 514, internal loading model 516, uninterrupted control model 518, or interrupted control model 520 so they can more accurately determine the impact an intervention may have on a point or variable of BMS 400. Further, by discarding the faulty data, data handler 512 may not use such faulty data when predicting impacts of interventions.

In some embodiments, data handler 512 generates and/or transmits timeseries data to historical database 524 or to each or a portion of external loading model 514, internal loading model 516, uninterrupted control model 518, and interrupted control model 520. Timeseries can be a collection of values for a particular point (e.g., a discharge air temperature point of an air handling unit, a discharge air temperature, a supply fan status, a zone air temperature, a humidity, a pressure, etc.) generated at different times (e.g., at periodic intervals). The values may include or be associated with identifiers of the building devices with which the points are associated (e.g., an air handler, a VAV box, a controller, a chiller, a boiler, vents, dampers, etc.). Each timeseries can include a series of values for the same point and a timestamp for each of the data values. For example, a timeseries for a point provided by a temperature sensor (e.g., provided through local gateways) can include a series of temperature values measured by the temperature sensor and the corresponding times at which the temperature values were measured. Timeseries may be generated by data handler 512. An example of a timeseries which can be generated by data handler 512 is as follows:

[<key, timestamp$_1$, value$_1$>, <key, timestamp$_2$, value$_2$>, <key, timestamp$_3$, value$_3$>]

where key is an identifier of the source of the raw data samples (e.g., timeseries ID, sensor ID, device ID, etc.), timestamp$_i$ may identify the time at which the ith sample was collected, and value$_i$ may indicate the value of the ith sample.

Data handler 512 may also transmit timeseries data or values to external loading model 514, internal loading model 516, uninterrupted control model 518, or interrupted control model 520, data handler 512. To do so, data handler 512 may process the timeseries data into a format that can be used as an input. For example, data handler 512 may generate a feature vector from data in historical database 524. The feature vector may include numerical identifiers for the data. The numerical identifiers may be the values of the data. In some embodiments, the values of the data are divided and grouped based on the device with which the values are associated. In some embodiments, the values of on or off is binary in which on is represented by a one and off is represented by a zero. In some instances, the feature vector may be a binary vector. Data handler 512 may also include identifiers of the timestamps associated with the values in the feature vector. Data handler 512 may generate the feature vector in any manner and to have any format. As described herein, when data handler 512 provides timeseries, for training or otherwise, to external loading model 514, internal loading model 516, uninterrupted control model 518, and/or interrupted control model 520, it may be providing a feature vector or data in some other machine recognizable format to the respective machine learning model.

External loading model 514 may be or may include a machine learning model (e.g., a neural network, a support vector machine, random forest, etc.) that is dedicated to determining effects that external factors (e.g., outdoor air temperature, outdoor air humidity, sun exposure, etc.) may have on the control system of BMS 400. For example, external loading model 514 may use outside air temperature, outdoor air humidity, and/or sun exposure values to predict the heat load that may be placed on BMS 400. In some embodiments, external loading model 514 is a recurrent neural network (RNN) such as a long short-term memory (LSTM) model which can use timeseries data and/or predictive timeseries to make predictions for heat loads for multiple time-steps. For example, external loading model 514 may receive predicted values obtained from an external weather service to predict a heat load for hourly time-steps based on a predicted temperature, humidity, and sun exposure values associated with the hourly time-step and, in some cases, hours previous to the hourly time-step. In another example, external loading model 514 may recursively predict the heat load at the hourly time-steps by predicting the heat load that will be placed on BMS 400 one time-step into the future based on timeseries data from one or more hours previous to the time-step. External load model 514 may use the predicted heat load as an input in addition to at least a portion of the timeseries from hours previous to the current hour to determine the heat load for two hours into the future. External loading model 514 may continue to recursively predict the heat load for any number of hourly time-steps (or any other time measurement) depending on how external loading model 514 is configured. RNNs are described with further reference to U.S. patent application Ser. No. 16/549,656 filed Aug. 23, 2019, and U.S. patent application Ser. No. 16/549,744, also filed Aug. 23, 2019, the entirety of each of which is incorporated by reference herein.

To train external loading model 514, data handler 512 may be configured to use building data that is stored in historical database 524 and/or training database 530. Data handler 512 may retrieve the building data and convert it into training data. For example, data handler 512 may be configured to generate a feature vector including timeseries for the outdoor air temperature, outdoor air humidity, sun exposure, and the resulting heat load. Each of the outdoor air temperature, outdoor air humidity, and sun exposure may be inputs into external loading model 514 while the resulting heat load may be an output. Consequently, data handler 512 may use supervised training methods (e.g., training methods that involve inputs tagged with the correct outputs) to train external loading model 514 to determine heat loads placed on a building system from external loading disturbances. Data handler 512 may train external loading model 514 to use any type of external loading disturbance to predict the heat load for various time-steps into the future. An example training dataset for external loading model 514 is shown and described below with reference to FIG. 7.

Data handler 512 may input the training data into external loading model 514 for training. External loading model 514 may predict what the heat load will be for a given time-step based on the training data. For example, data handler 512 may generate a feature vector including predicted outdoor air temperature, outdoor air humidity, and sun exposure values for hours between noon and 8:00 PM. External loading model 514 may predict what the heat load will be for one or more of each hour. External loading model 514 may compare the predictions to the actual heat load values and adjust its internal weights and/or parameters so it may more accurately predict heat load values for future inputs. Data handler 512 may determine an accuracy of external loading model 514 by comparing predicted values to corresponding correct values and determining how close the corresponding values are to each other. Data handler 512 may continue to input training data to external loading model 514 until it determines that external loading model 514 is accurate to a threshold. Once trained, external loading model 514 may provide an output including predicted heat loads for a number of time-steps to one or both of uninterrupted control model 518 and interrupted control model 520.

Internal loading model 516 may be or may include a machine learning model (e.g., a neural network, a support vector machine, random forest, etc.) that is dedicated to determining effects that internal factors (e.g., space occupancy, zone air temperature, space size, etc.) may have on the control system of BMS 400. For example, internal loading model 516 may use the space occupancy, the zone air temperature, and/or space size of a building or spaces within a building to predict the equipment cooling load that may be placed on BMS 400. In some instances, outside weather values may also be used as inputs into internal loading model 516. In some embodiments, internal loading model 516 is a LSTM model that can use timeseries data and/or predictive timeseries data to make such predictions. For example, internal loading model 516 may obtain predicted values obtained from a model including expected values of various points of BMS 400 to predict a cooling load for hourly time-steps into the future.

For example, internal loading model 516 may predict the cooling load for each time-step based on the predicted space occupancy, zone air temperature of a building, zone air temperature setpoint, space size, and/or any other aspect of BMS 400. Internal loading model 516 may do so based on predicted values for each aspect and each time-step and, in some cases, hours previous to the time-step. In some embodiments, internal loading model 516 recursively predicts the equipment cooling load of BMS 400 for hourly time-steps by predicting the cooling load that may be placed on BMS 400 one time-step into the future based on timeseries data from one or more hours previous to the time-step. The predicted cooling load for the time-step may be used as an input in addition to at least a portion of the timeseries from time-steps previous to the time-step to determine the equipment cooling load for two time-steps into the future. Internal loading model 516 may repeat this process to predict the cooling load for any number of hourly time-steps (or any other time measurement depending on the desired level of granularity, such as, but not limited to, seconds, minutes, days, weeks, etc.) depending on how internal loading model 516 is configured.

Internal loading model 516 may be trained in a manner similar to how external loading model 514 is trained. For example, data handler 512 may be configured to use building data that is stored in historical database 524 and/or training database 530 to train internal loading model 516. Data handler 512 may retrieve the building data and convert it into training data. For example, data handler 512 may be configured to generate a feature vector including timeseries values for space occupancy, zone air temperature, space size, and the resulting equipment cooling load. Each of the zone air temperature, space size, and space occupancy may be inputs into internal loading model 516 while the resulting equipment cooling load may be a tagged output.

Internal loading model 516 may receive such training sets and be trained using a supervised method. For example, data handler 512 may input a training set including values for space occupancy, zone air temperature, and/or space size (which may remain constant) from 10:00 AM to 5:00 PM including predicted values for each minute in the time frame. Internal loading model 516 may predict equipment cooling loads for each minute based on the values. Internal loading model 516 may compare the predicted equipment cooling loads to actual equipment cooling loads and adjust its internal weights and/or parameters accordingly.

Advantageously, by training and implementing internal loading model 516 to predict the effects that internal loading disturbances may have on a building site, the machine learning models described below may more accurately determine the effect an intervention of a point may have on BMS 400. This may be important, for example, if a chiller of BMS 400 will operate at max capacity four hours from when an operator attempts to intervene in the control system of BMS 400 and the intervention adds a further cooling load to the chiller, which could cause it to malfunction.

Uninterrupted control model 518 may be or may include a machine learning model (e.g., a neural network, a support vector machine, random forest, etc.) that is dedicated to determining values of various points or variables of BMS 400 if a user does not intervene into the operation of BMS 400. For example, uninterrupted control model 518 may use the outputs from external loading model 514 and internal loading model 516 along with available building data (live or historical) to determine how the control system of BMS 400 will continue to operate without any interventions. In some embodiments, uninterrupted control model 518 is an RNN such as an LSTM model that can use timeseries data and/or predictive timeseries data to make such predictions. For example, uninterrupted control model 518 may obtain predicted heat loads that external loading model 514 predicts for a time period into the future, predicted equipment cooling loads that internal loading model 516 predicts for the same time period, and building timeseries data indicating how BMS 400 is currently operating and/or was recently operating. Uninterrupted control model 518 may then predict values for a point for the time period by assuming that there will not be an intervention related to the point in the future. Consequently, uninterrupted control model 518 may predict how BMS 400 will operate for a set time period into the future.

For example, uninterrupted control model 518 may be configured to predict discharge air temperature values for a space of BMS 400 for hourly time-steps within a 10 hour time period. Uninterrupted control model 518 may do so based on inputs it receives from external loading model 514, internal loading model 516, and building data such as a position of a cooling valve. The inputs may be predicted values (e.g., predicted cooling valve positions, heat loads, equipment cooling loads, etc.) for each time-step within the 10 hour time period. Uninterrupted control model 518 may receive the predicted values and predict discharge air temperature values for each time-step. Uninterrupted control model 518 may perform similar processes for other points as well such as, for example, predicting humidity, pressure, water temperature, energy consumption, etc., over time.

Uninterrupted control model 518 may be trained in a manner similar to how external loading model 514 and/or internal loading model 516 are trained. For example, data handler 512 may be configured to use building data that is stored in historical database 524 and/or training database 530 to train uninterrupted control model 518. Data handler 512 may retrieve the building data and convert it into training data. For example, data handler 512 may be configured to generate a feature vector including timeseries values for a heat load, a building equipment cooling load, and various points of BMS 400 to predict values for time-steps into the future for a specific point (e.g., discharge air temperature setpoint, humidity setpoint, pressure setpoint, energy consumption, zone air temperature, supply vent state, supply fan state, ductwork damper state, cooling coil valve position, etc.). The feature vector may also include the correct values for the point at each time-step. Uninterrupted control model 518 may predict values for each time-step and compare the predicted values to the correct values to determine how close the predictions are to the correct values. Uninterrupted control model 518 may adjust its internal weights and/or parameters based on the comparison for training. Data handler 512 may continue to train uninterrupted control model 518 until uninterrupted control model 518 is accurate to a threshold, as described above.

In some embodiments, uninterrupted control model 518 predicts probabilities for values of a point for each time-step and selects the value with the highest probability to be the correct value for the time step. For example, uninterrupted control model 518 may predict a humidity percentage for a room in BMS 400. Uninterrupted control model 518 may predict the probabilities for one or more percentages up to 100%. Uninterrupted control model 518 may select the percentage that is associated with the highest probability to be the humidity percentage for the time step. Uninterrupted control model 518 may predict probability values for any number of time-steps and/or values.

Advantageously, because uninterrupted control model 518 predicts values based on an intervention not occurring, uninterrupted control model 518 may provide operators glimpses into how BMS 400 will operate while operating in set conditions (e.g., pre-configured positions). Accordingly, building operators may view the outputs of uninterrupted control model 518 and determine if equipment of BMS 400 may be configured differently to operate more efficiently or for the environment of BMS 400 to be at more desirable levels.

Interrupted control model 520 may be or may include a machine learning model (e.g., a neural network, a support vector machine, random forest, etc.) that is dedicated to determining values of various points or variables if a user intervenes into the operation of BMS 400. For example, interrupted control model 520 may use the outputs from external loading model 514 and internal loading model 516 along with available building data (live or historical) to determine how the control system of BMS 400 will operate an intervention input is implemented. In some embodiments, interrupted control model 520 is an LSTM model that can use timeseries data and/or predictive timeseries data to make such predictions. For example, interrupted control model 520 may obtain predicted heat loads that external loading model 514 predicts for a time period into the future, predicted equipment cooling loads that internal loading model 516 predicts for the same time period, and timeseries data indicating how BMS 400 is currently operating and/or was recently operating. Interrupted control model 520 may then predict values for a point for the time period based on the intervention being implemented. Consequently, interrupted control model 520 may predict how BMS 400 may operate for a set time period into the future if an operator attempts to intervene with how BMS 400 normally operates.

For example, interrupted control model 520 may be configured to predict discharge air temperature values for a space of BMS 400 for hourly time-steps within a 10 hour time period if an operator were to manually change the cooling coil valve position at the beginning of the 10 hour time period. Interrupted control model 520 may do so based on inputs it receives from external loading model 514, internal loading model 516, and/or other building data (e.g., positions of a cooling valve, pressure values, humidity values, zone air temperature values, etc.) over time. In some instances, the inputs are predicted values (e.g., predicted cooling valve positions, heat loads, equipment cooling loads, etc.) for each time-step within the 10 hour time period. Interrupted control model 520 may receive the predicted values and predict discharge air temperatures values for each time-step. Interrupted control model 520 may be trained to perform similar processes for other points as well such as, for example, predicting humidity, pressure, water temperature, energy consumption, etc., over time.

In some embodiments, interrupted control model 520 includes more than one machine learning model to predict values of variables or points of the building system. For example, one machine learning model of interrupted control model 520 may be trained to predict energy consumption values of BMS 400 if the intervention were to be implemented. Another machine learning model may be trained to predict comfortability scores (e.g., levels of comfort that occupants of a building feel under the building's current conditions). Interrupted control model 520 may include any number of machine learning models to predict the impact that an intervention may have on various variables or points of BMS 400. Similarly, uninterrupted control model 518 may include matching or otherwise similar machine learning models to the machine learning models of interrupted control model 520. The machine learning models of uninterrupted control model 518 may be trained to predict future values of the points or variables over time if an intervention were not to be implemented.

Interrupted control model 520 may be trained in a manner similar to how uninterrupted control model 518 is trained. For example, data handler 512 may be configured to use building data that is stored in historical database 524 and/or training database 530 to train interrupted control model 520. Data handler 512 may retrieve the building data and convert it into training data. For example, data handler 512 may be configured to generate a feature vector including timeseries values for a heat load, a building equipment cooling load, and various points of BMS 400 to predict values for timesteps into the future for a specific point (e.g., discharge air temperature, humidity, pressure, energy consumption, zone air temperature, etc.). The feature vector may also include the correct values for the point at each time-step. Interrupted control model 520 may predict values for each time-step and compare the predicted values to the correct values to determine how close the predictions are to the correct values. Interrupted control model 520 may adjust its internal weights and/or parameters based on the comparison for training. Data handler 512 may continue to train interrupted control model 520 until interrupted control model 520 is accurate to a threshold, as described above.

In some embodiments, interrupted control model 520 predicts probabilities for values of a point for each time-step and selects the value with the highest probability to be the correct value for the time step. For example, interrupted control model 520 may predict a humidity percentage for a room in BMS 400. Interrupted control model 520 may predict the probabilities for one or more percentages up to 100%. Interrupted control model 520 may select the percentage that is associated with the highest probability to be the humidity percentage for the time step. Interrupted control model 520 may predict probability values for any number of time-steps and/or values.

In some embodiments, the same training data that is used to train interrupted control model 520 is used to train uninterrupted control model 518. In such embodiments, interrupted control model 520 may be trained to provide the same outputs based on the same inputs as uninterrupted control model 518. Such training may be advantageous because it removes the step of only using training data that is tagged or that is otherwise associated with an intervention or not associated with an intervention. Consequently, the amount of training data available to train interrupted control model 520 and uninterrupted control model 518 may greatly increase. The increase in training data may allow for each machine learning to be trained more quickly and to be more accurate.

Advantageously, because interrupted control model 520 predicts values based on an intervention occurring, interrupted control model 520 may provide operators glimpses into how BMS 400 may operate while operating in varying conditions such as when an operator or BMS 400 implements an intervention. Accordingly, building operators may view the outputs of interrupted control model 520 and determine if and/or when an operator or BMS 400 should implement any interventions or modifications of the proposed intervention.

Model output aggregator 522 may be or may include a component that is dedicated to obtaining the outputs of any portion of the external loading model 514, internal loading model 516, uninterrupted control model 518, and interrupted control model 520 and displaying the outputs on a user interface. For example, model output aggregator 522 may generate a user interface that illustrates values of a point for future times in which an operator or otherwise BMS 400 attempts to implement an intervention that affects the point. Model output aggregator 522 may illustrate a time frame in which the intervention would cause the point to enter and/or leave a comfortable range. Model output aggregator 522 may also illustrate values of the point in the same graph so a user can easily see differences between the impact an intervention may have on the point and what the values of the point would be if the intervention were not implemented. In some embodiments, model output aggregator 522 illustrates a comparison of energy savings over time with an optimized occupant comfort level if the intervention were to be implemented and, in some instances, if the intervention were not to be implemented. Consequently, model output aggregator 522 may display in a single interface not only whether an intervention should be implemented, but also the best time frame in which to implement the intervention. In some cases, model output aggregator 522 may generate the interface to give users an opportunity to select the time frame to implement the intervention. In other cases, model output aggregator 522 may use the data generated from the machine learning models to automatically determine whether to implement interventions and/or a time period in which to implement them.

In some instances, a user may view the output of external loading model 514, internal loading model 516, uninterrupted control model 518, and/or interrupted control model 520 and modify an intervention that the user initially proposed so values of other points or variables may remain within desirable ranges. The user may modify the intervention by adjusting (via a user interface) the new value and/or timeframe of the intervention from the new value and/or timeframe of the initially proposed intervention. For example, a user may propose to change a zone-air temperature setpoint from 70 degrees to 68 degrees to make a room more comfortable for its occupants. Output aggregator 522 may display a user interface that indicates that such a change would cause energy consumption of the BMS to significantly increase outside of a desirable range. Accordingly, the user may modify the intervention to change the setpoint of the zone-air temperature to 69 degrees. Similarly, model output aggregator 522 may modify any interventions that it proposed to implement if model output aggregator 522 determines (e.g., based on outputs from external loading model 514, internal loading model 516, uninterrupted control model 518, and/or interrupted control model 520) that the proposed intervention would bring any points or variables of the BMS outside of its corresponding desirable range of values.

Referring now to FIG. 6, a table showing an example of historical data in historical database 524 of intervention prediction system 502, shown and described with reference to FIG. 5, is shown, according to some embodiments. Table 600 is shown to include data points represented by each row of table 600. Each data point may include any of an identifier, a timestamp, a value, a comfortability score, energy consumption, or semantic data identifying different aspects (e.g., points or characteristics of a building) with which the data point is associated. In some embodiments, the data points do not include timestamps. In some embodiments, data handler 512 can parse through data of table 600 to generate timeseries to train the machine learning models of intervention prediction system 502.

Each of the machine learning models may receive the training data and accordingly learn to output their respective outputs. For example, external loading model 514 may learn to output future heat loads that may impact BMS 400. Internal loading model 516 may learn to output future equipment cooling loads that may impact BMS 400. Uninterrupted control model 518 may learn to predict future values for a point of BMS 400 assuming that a user does not input an intervention. Uninterrupted control model 518 may learn to predict future values for a point of BMS 400 assuming that a user does input an intervention of a point. Consequently, each model may learn to handle feature vector inputs including point inputs. As shown, examples of points that are in historical database 524 may include hot water supply temperature, supply fan status, zone temperature, chiller water supply temperature, and discharge air temperature. Data related to any point of a building system may be included in historical database 524.

Referring now to FIG. 7, a table 700 showing an example of timeseries data in a training dataset associated with external loading disturbances is shown, according to some embodiments. The timeseries data may show heat load values of a building for hourly time-steps between 1:00 AM and 8:00 AM. Each heat load value may be associated with external factors such as outdoor air temperature, outdoor air humidity, and sun exposure coefficient. The heat load values may be associated with any external factors that may impact the heat loads that are placed on building systems. Further, while the times of the timeseries of table 700 are shown to be associated with hourly increments, external loading disturbances timeseries may include values for any time increments. There may be values for any number of time-steps in external loading disturbances timeseries.

In some embodiments, external loading disturbances timeseries may include predicted values for each time-step of the timeseries. For example, each of the values of the outdoor air temperature, the outdoor air humidity, and/or the sun exposure of table 700 may be previously predicted values that are associated with the times. The heat load values may be the actual heat load values of the times. The predicted values may come from external data source providers (e.g., a weather service) or from a model that is implemented internally.

Data handler 512 may use timeseries data similar to the timeseries of table 700 to train external loading model 514 to predict the heat load that will likely be placed on a building at various points in time. For example, data handler 512 may obtain predicted values for the outside air temperature, humidity, and/or sun exposure for each hour between noon and midnight of a previous day. Data handler 512 may also obtain the actual heat load that was placed on the building at the same times. Data handler 512 may generate a training dataset using the obtained data and input the training dataset into external loading model 514 to obtain an output predicting the heat load for each time between noon and midnight. Data handler 512 may input the correct heat load for each hour and external loading model 514 may adjust its internal weights and/or parameters so it can more accurately predict heat loads for future inputs.

Referring now to FIG. 8, a table 800 showing an example of timeseries data in a training dataset associated with internal loading disturbances is shown, according to some embodiments. The timeseries data may show equipment cooling load values of a building for hourly time-steps between 1:00 AM and 8:00 AM. Each equipment cooling load value may be associated with a space occupancy, a current zone air temperature, and/or a zone air temperature setpoint. The equipment cooling load values may be associated with any aspect of a building and the equipment that operates within the building. Further, while the times of the timeseries of table 800 are shown to be associated with hourly increments, internal loading disturbances timeseries may include values for any time increments. There may be values for any number of time-steps in internal loading disturbances timeseries.

In some embodiments, internal loading disturbances timeseries may include predicted values for each time-step of the timeseries. For example, each of the values of the space occupancy, the current zone air temperature, and the zone air temperature setpoint of table 800 may be a previously predicted value associated with its respective time. The equipment cooling load values may be the actual equipment cooling load values of the times determined based on the internal loading disturbance values of the same times. In some embodiments, as shown in table 800, internal loading disturbances may also include internal heat loads such as internal heat loads that are associated with computers, printers, lights, scanners, monitors, televisions, security systems, cameras, fax machines, etc. Such internal loading disturbances may affect the equipment cooling load, comfortability of a space, and/or other points or variables of spaces or buildings. The internal heat load of a space may be higher or lower based on the number of occupants of the space (e.g., in some instances, a higher number of people may be correlated with a higher heat load). The predicted values may come from external data source providers or from internal data source providers such as a model that is developed and/or implemented internally.

Data handler 512 may use timeseries data similar to the timeseries of table 800 to train internal loading model 516 to predict the equipment cooling load that will likely be placed on a building at various points in time. For example, data handler 512 may obtain predicted values for the space occupancy, zone air temperature, and/or zone air temperature setpoint for each hour between 1 PM and 11 PM of a previous day. Data handler 512 may also obtain the equipment cooling load that was placed on the building at the same times. Data handler 512 may generate a training data set with the obtained data and input the training dataset into internal loading model 516 to obtain an output predicting the equipment cooling load for each time between 1 PM and 11 PM. Data handler 512 may input the equipment cooling load for each hour and internal loading model 516 may adjust its internal weights and/or parameters so it can more accurately predict equipment cooling loads based on future inputs.

FIG. 9 is a table 900 showing an example of timeseries data in a training dataset associated with an intervention, according to some embodiments. The training dataset may be associated with an intervention because it represents a timeseries in which an operator intervenes into how building equipment of a building is operating. For example, the training dataset of table 900 shows data in a time period in which an operator changed the position of the cooling coil valve at 3 AM from 50% to 100%. The timeseries data may show zone air temperatures, comfortability scores, and correlated (e.g., associated with the same time) energy consumption values of a building for hourly time-steps between 1:00 AM and 8:00 AM. Each zone air temperature, comfortability score, and/or energy consumption value may be determined based on or otherwise associated with a predicted heat load (in some cases determined by external load model 514), a predicted equipment cooling load (in some cases determined by internal load model 516), and a cooling coil valve position. In some embodiments, values of building data indicating how the building is operating are included in intervention timeseries in addition to predicted heat loads, predicted equipment cooling loads, and cooling coil valve positions. Further, while the times of the timeseries of table 900 are shown to be associated with hourly increments, intervention timeseries may include values for any time increments. There may also be values for any number of time-steps in intervention timeseries.

Data handler 512 may use timeseries data similar to the timeseries of table 900 to train interrupted control model 520 to predict the zone air temperature, the energy consumption of the building, or the comfortability of the building over time when an operator inputs an intervention. In some embodiments, data handler 512 trains different machine learning models using training datasets similar to the intervention timeseries of table 900 to predict zone air temperature values, energy consumption values, and/or comfortability scores of a building based on similar inputs associated with an intervention. For example, data handler 512 may input the training data set of intervention timeseries of table 900 into one machine learning model of interrupt control model 520 to predict the zone air temperature over time of a building based on the intervention timeseries. The machine learning model may predict values for the zone air temperature between 1 AM and 8 AM. In some cases, the machine learning model may predict probabilities of values for each time-step between 1 AM and 8 AM and select the zone air temperature values that are associated with the highest probability for each time step. The machine learning model may compare predicted outputs to corresponding actual outputs of the training dataset for each time stamp and adjust its internal weights and/or parameters based on the differences between the outputs. Data handler 512 may similarly train other machine learning models of interrupted control model 520 to predict the energy consumption of the building at select time-steps and/or comfortability scores at such time-steps when an intervention is implemented.

FIG. 10 is a table 1000 showing an example of timeseries data in a training dataset associated with a building without any interventions, according to some embodiments. The training dataset may not be associated with an intervention because there is not an input that occurs during the time of the timeseries data that causes a cooling coil valve to change positions from its normal position. For example, the training dataset of table 900 shows data in a time period between 1 AM and 8 AM in which a cooling coil valve position remains the same as it is normally configured. Similar to the training data set of FIG. 9, the training data set of table 1000 is shown to include zone air temperature values, comfortability scores, and correlated (e.g., associated with the same time) energy consumption values of a building for hourly time-steps between 1:00 AM and 8:00 AM. Each zone air temperature value, comfortability score, and/or energy consumption value may be determined based on or otherwise associated with a predicted heat load (in some cases determined by external load model 514), a predicted equipment cooling load (in some cases determined by internal load model 516), and a cooling coil valve position. In some embodiments, values of building data indicating how the building is operating are included in the non-intervention timeseries in addition to the predicted heat loads, predicted equipment cooling loads, and cooling coil valve positions. Further, while the times of the timeseries of table 1000 are shown to be associated with hourly increments, intervention timeseries may include values for any time increments. There may also be values for any number of time-steps in intervention timeseries.

Data handler 512 may use timeseries data similar to the timeseries of table 1000 to train uninterrupted control model 518 to predict the zone air temperature, the energy consumption of the building, or the comfortability of the building over time when an operator does not input an intervention. In some embodiments, data handler 512 trains different machine learning models of uninterrupted control model 518 using training datasets similar to the non-intervention timeseries of table 1000 to predict zone air temperature values, energy consumption values, and/or comfortability scores of a building over time. For example, data handler 512 may input the training data set of non-intervention timeseries of table 1000 into one machine learning model of uninterrupted control model 518 to predict zone air temperature values of a building over time based on the non-intervention timeseries. The machine learning model may predict values for the zone air temperature between 1 AM and 8 AM based on the training data set. In some cases, the machine learning model may predict probabilities of values for each time-step between 1 AM and 8 AM and select the zone air temperature values that are associated with the highest probability for each time-step. The machine learning model may compare predicted outputs to corresponding actual outputs of the training dataset for each time-stet and adjust its internal weights and/or parameters based on the differences between the outputs. Data handler 512 may similarly train other machine learning models of uninterrupted control model 518 to predict the energy consumption of the building at select time-steps and/or comfortability scores at such time-steps when an intervention is not implemented.

Figure 11:
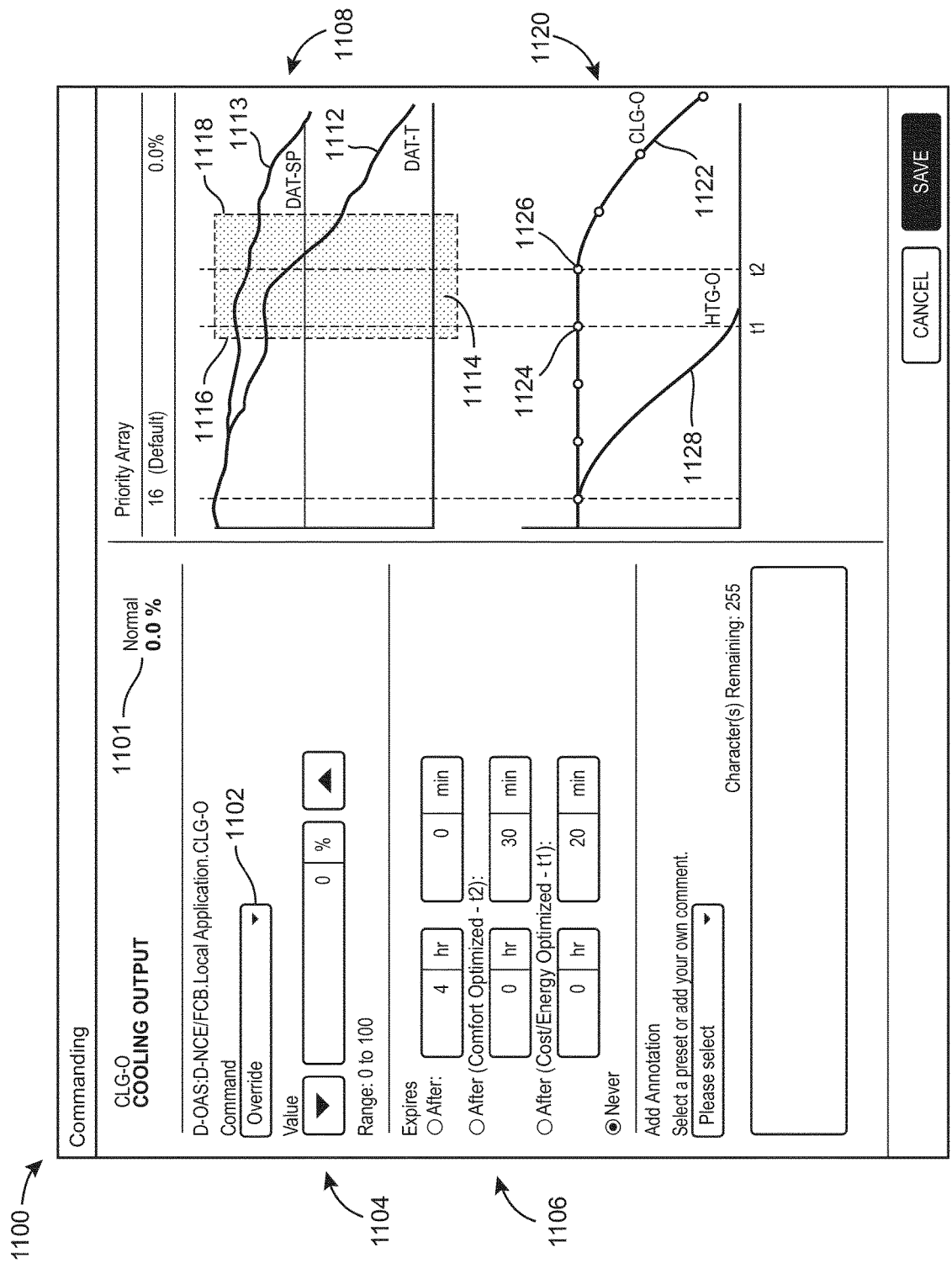
FIG. 11 is a drawing of an example user interface associated with the intervention prediction system of FIG. 5, according to some embodiments.

Referring now to FIG. 11, a drawing of an example user interface 1100 associated with intervention prediction system 502, shown and described with reference to FIG. 5, is shown, according to some embodiments. User interface 1100 is shown to include a normal point value 1101, a command option 1102, a new point value 1104, a range setting 1106, a point value prediction graph 1108, and a variable prediction graph 1120. An operator may access user interface 1100 to view each of these components to determine whether to intervene into how BMS 400 is operating. For example, an operator may view user interface 1100 and input an intervention value to change a position of a cooling coil valve via new point value 1104. In some instances, the operator may change the intervention value to values between 0 and 100. However, user interface 1100 may enable operators to change the cooling coil valve position to values in any percentage range. Upon inputting the desired intervention position, user interface 1100 may illustrate the effects that implementing the desired intervention position will have on a discharge temperature point of BMS 400 via value prediction graph 1108. Value prediction graph 1108 may show the predicted discharge air temperature of BMS 400 if the change were to be implemented and the predicted discharge air temperature of BMS 400 if the change were not to be implemented. User interface 1100 may also illustrate the cost savings and the comfortability changes that implementing the intervention would cause in BMS 400 via variable prediction graph 1120.

Value prediction graph 1108 may be a line graph that illustrates how changing the cooling coil valve position from its normal operation position will impact the discharge air temperature of BMS 400. Value prediction graph 1108 is shown to include intervention values 1112 that indicate the discharge air temperature over time if the intervention were to be implemented and non-intervention values 1113 if the intervention were not to be implemented. Each of intervention values 1112 and non-intervention values 1113 indicate their respective values over time. Value prediction graph also shows comfortability zone 1114 with a first time 1116 indicating when an intervention would cause the discharge air temperature value to enter comfortability zone 1114 (as determined by an administrator) and a second time 1118 in which the discharge air temperature would leave comfortability zone 1114. Comfortability zone 1114 may indicate a zone of time in which the discharge air temperature values are within a comfortable range of time as determined by an administrator. Advantageously, by displaying discharge air temperature values in which the intervention is and is not implemented, an operator may easily view the effect that changing the position of the cooling coil valve may have on the discharge air temperature of BMS 400. Further, by viewing comfortability zone 1114, operators may be able to easily determine how long to change the standard position of the cooling coil valve.

Variable prediction graph 1120 may be another line graph that illustrates how an intervention may affect cost/energy savings and/or occupant comfortability over time. Variable prediction graph 1120 is shown to include comfortability scores 1122 and cost savings values 1128. Comfortability scores 1122 may indicate a level of comfort that an occupant of BMS 400 may have over time while being located in the building of BMS 400 after the intervention indicated in new point value 1104 is implemented. Cost savings values 1128 may indicate an amount of cost/energy that may be saved over time after the intervention is implemented. A third time 1124 may indicate an optimized time to release an intervention for the highest cost/energy savings. A fourth time 1126 may indicate an optimized time to release an intervention for the highest occupant comfort. Advantageously, by illustrating cost savings and occupant comfortability scores over time in the same graph, an operator viewing the graph may more easily determine how long to implement any interventions to both improve their comfortability and increase any cost/energy savings that the intervention may provide.

Figure 12:
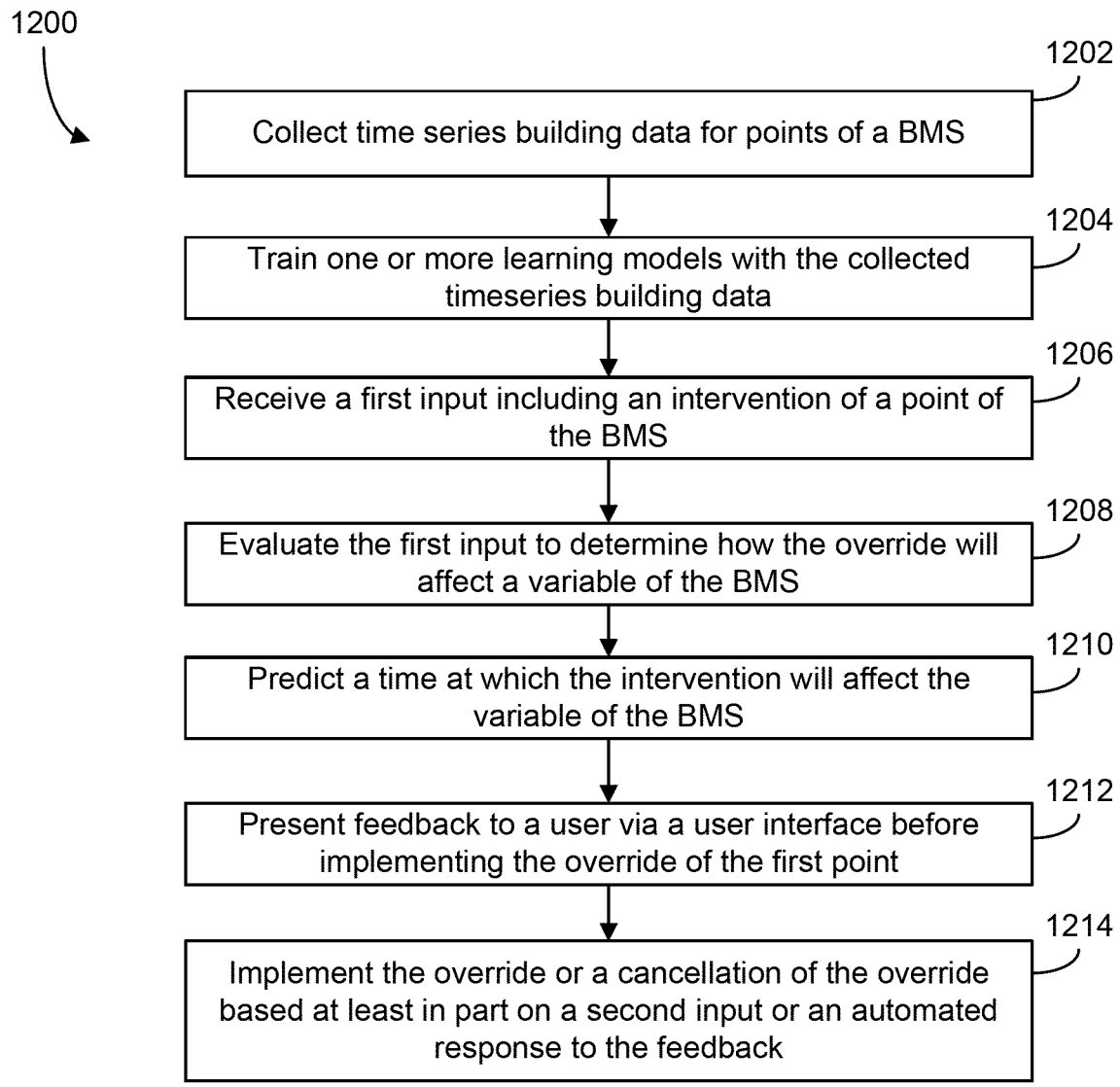
FIG. 12 is a flow diagram of an example process for predicting the effects and applying an intervention that can be performed by the intervention prediction system of FIG. 5, according to some embodiments.

Referring now to FIG. 12, a flow diagram of a process 1200 for a method for predicting a time of effect of an intervention of a point of a BMS, according to some embodiments. Process 1200 can be performed by any controller or processor of a BMS. For example, process 500 may be performed by one or more data processing systems (e.g., intervention prediction system 502 and/or BMS controller 366). Process 1200 may enable such data processing systems to automatically determine whether to change the operating conditions of the BMS. Various machine learning models may be trained to automatically determine the effect that an intervention of a point will have another point or a variable of the BMS for a set time period into the future. Such determinations may be used to automatically control building equipment to increase the comfort of any occupants of the BMS and/or decrease the costs of operating the equipment of the BMS. The outputs of the machine learning models may be displayed in one user interface. Operators may view these outputs in the user interface and determine whether to implement a desired intervention. Process 1200 may allow operators to view the effects of intervening into the operation of the BMS before implementing any interventions. Process 1200 can include any number of steps and the steps can be performed in any order.

Process 1200 is shown to include collecting timeseries building data for points of the BMS (step 1202). In some embodiments, step 1202 is performed by, for example, data handler 512. The timeseries building data may include historical values and/or live values of the BMS and from other BMS's that are connected to a common cloud database. The collected values may be for points and/or variables such as, but not limited to, valve positions, dampers, setpoints, outdoor air temperature values, outdoor air humidity, sun exposure, space occupancy, space temperature, etc. The collected values may also include heat loads, equipment cooling loads, energy consumption values, comfortability scores, etc. Values may be collected from various sensors of the BMS and/or from "smart components" of the BMS such as smart chillers. The sensors may transmit such data through local gateways. Smart components may include building equipment with built-in controllers that are used to automatically operate the equipment and determine how the equipment is functioning.

The values may be associated with times and/or otherwise be associated with timeseries. Each timeseries may include a series of values for a point indicating values of the point over time and identifiers for the timeseries (e.g., timeseries ID, sensor ID, device ID, etc.). Each value may be associated with a timestamp. Consequently, collected timeseries may identify times in which a particular point was at a particular value.

Predictive values for points or variables may also be collected. Predictive values may be values that an external or internal data source provider provides to the BMS to predict what values for points or variables will be at various time steps. For example, an external weather service may predict what the outside air temperature will be in the area of the BMS for hourly time-steps between 10 AM and 10 PM. In another example, an internal modeling service of the BMS may predict values for an expected occupancy of the BMS for hourly time-steps within a similar time period. Such values may be collected as a timeseries. In another example, predictive values may be collected based on how the building management is currently or scheduled to be configured. For example, a timeseries may be generated based on a zone air temperature setpoint that is scheduled to remain the same over time between 9 AM and 5 PM the next day. In another example, internal data source providers may predict use of machines such as computers, printers, scanners, monitors, televisions, security systems, cameras, fax machines, lights, etc., in buildings. Each of these machines and, in some cases, each occupant of a space, may be associated with an internal heat load. Internal source providers may predict such use and occupancy and/or the associated heat loads based on each components normal use and occupancy. For instance, in some cases, the internal data source providers may provide data based on how or when such equipment is used within similar previous time periods (e.g., same day of the week, same time frame of a day, a combination of the same the day of the week and the same time frame, etc.). In yet another example, internal data source providers may predict electricity use in a space and/or subspace of a building. The internal data source provider may make such predictions based on previous data within similar previous time periods similar to the above. Values for any point may be collected and used to generate timeseries values.

Advantageously, by collecting live data, historical data, and/or predictive data, machine learning models of the BMS may be trained to use any type of data to predict the impact an intervention may have on the BMS. For examples, machine learning models may be trained to use predictive data to predict external and internal loads that may be placed on the BMS in the future. In another example, machine learning models may be trained to use live and historical data to predict how current and/or previous timeseries may be used to predict future values for points such as, but not limited to, building energy consumption, comfortability scores, zone air temperatures, zone humidity, discharge air temperatures, etc.

Process 1200 is shown to include training one or more machine learning models with the collected timeseries building data (step 1204). The machine learning models may be support vector machines, random forests, neural networks, etc. In some embodiments, the machine learning models are recurrent neural networks such as long short-term memory models trained to predict values for points for multiple time-steps into the future. The machine learning models may be trained using data generated locally at the BMS and/or from other BMS's via a cloud server or database. For example, one machine learning model may be trained to predict a heat load that may be placed on the BMS for time-steps into the future. Another machine learning model may be trained to predict an equipment cooling load that may be placed on the BMS for time-steps into the future. A third machine learning model may be trained to predict values of a variable for time-steps into the future if an intervention were not to be implemented. A fourth machine learning model may be trained to predict values of the variable if the intervention were to be implemented. In some embodiments, additional machine learning models are trained to predict the energy consumption and/or the comfortability scores for instances in which the intervention were to be implemented and instances in which the intervention were not to be implemented. In some embodiments, separate machine learning models are trained for each or a portion of all of the points of the BMS. Any number of machine learning models may be trained using collected data.

Advantageously, by training machine learning models to predict the heat load and/or the equipment cooling load that may be placed on a building, the BMS may more accurately predict future values for points. It may be difficult to analytically predict or guess the heat load and/or equipment cooling loads that may be placed on the BMS so using machine learning models to do so provides advantages. The heat load and/or equipment cooling load may impact how building equipment of the BMS operate, so being able to predict accurate values for each of these loads may help the machine learning models more accurately predict future values for points or values.

To train one or more of the machine learning models of the BMS, training data may be generated and input into the machine learning models. Training data may be generated to include input output pairs so each model may learn to associate a given input with a given output. For example, a machine learning model may be trained to predict the heat load that will be placed on the BMS for each hour up to eight hours into the future. Training data may be generated that includes external disturbance factors that may impact the heat load at given times such as, for example, the outside air temperature, the weather (e.g., whether it is snowing, raining, sunny, cloudy, etc.), sun exposure, the humidity, the wind factor, etc. The training data may include timeseries with values for one or more of these external disturbance factors for up to eight consecutive hourly time-steps. The training data may be input into a machine learning model, which can in turn generate an expected output. The expected output may be specific values or a set of probabilities for multiple values. Each time-step may be associated with a predicted value or a set of probabilities for multiple values. The output generated based on the training data set may be compared to the labeled output (e.g., the correct heat load for the time) and the internal parameters and/or weights of the machine learning may be adjusted accordingly.

Similar training may be implemented to train other machine learning models of the BMS. For example, another machine learning model may be trained to automatically predict equipment cooling loads over time based on internal disturbances such as the occupancy, the space size, outdoor weather conditions, equipment configurations, etc., for various time-steps. Training data for such a machine learning model may include timeseries values for each or a portion of the internal disturbances that is labeled with corresponding equipment cooling load values. The training data may be input for training similar to how the training data for the machine learning was trained to predict values for the heat load over time. In another example, a third machine learning model may predict values of a point (any point of the BMS) over time. The third machine learning model may be trained to use the outputs of the machine learning models mentioned above along with any other data that may impact the point to predict values for the point for a future time period. Training data sets may including timeseries predictions from the machine learning models described above and other building data to train the third machine learning model to predict values for the point over time. Other machine learning models may be similarly trained to predict the energy consumption of the building and/or comfortability scores for the building over time. Any number of machine learning models may be trained to predict timeseries values for various points or variables of the BMS.

Finally, a fourth machine learning model may be trained to predict the impact an intervention may have on the point or variable of the BMS. An intervention may be a user or machine entered configuration change in one point from a pre-configured value. For example, a user may change the zone air temperature of a room because they are too hot. The user may input the change so they can be more comfortable. Unfortunately, such changes may affect other points or variables of the BMS, such as the comfortability, energy consumption, humidity, pressure levels, etc. The fourth machine learning model may be trained to predict the values of such points or variables of the BMS for multiple time-steps into the future. In some cases, the same training data may be input into the fourth machine learning model that was used as input into the third machine learning model. In other cases, only training data associated with interventions may be input for training. For example, timeseries for building data that is associated with times in which an intervention in a point was implemented may be tagged as being associated with an intervention. Such timeseries may be input into the fourth machine learning model for training similar to the above.

Advantageously, by using a collection of machine learning models to determine an impact that implementing an intervention may have on the BMS, a wide breadth of information may be provided to users and/or the BMS to better determine whether to implement the intervention. The machine learning models may be trained using only data that is local to the BMS or including data that is collected from other BMS's. Any number of machine learning models may be trained to predict future values for various points of the BMS. Furthermore, another advantage to the training described above is that the machine learning model that is trained to predict the impact to the point may do so based on interventions to any point that impacts the point. The machine learning model may do so because such interventions may only change values of the inputs to the machine learning model without changing types of data being inputs into the machine learning models. The possible outputs may remain the same. In some embodiments, systems predict future values for points of the BMS using other methods such as, but not limited to, rules based prediction, empiric data based prediction, model based predictions, etc. Such systems may be designed by an administrator based on historical data generated by any number of building management systems.

Process 1200 is shown to include receiving a first input including an intervention of a point of the BMS (step 1206). The first input may be received by any interfacing device of the BMS. As described above, an intervention may be a change to a point from how the point is generally configured to operate. For example, an intervention may include an input to open the cooling coil valve from being 50% open to 100% open. An operator may make such inputs from their personal computers or from other interfacing devices of the BMS that have access to the network of the BMS. For example, an operator may provide an input to a thermostat to temporarily change the zone air temperature of a room of the BMS. Another example of an intervention may be to override the security system of the BMS so occupants may occupy spaces of the BMS without setting off any alarms. In another example intervention, an operator may override the lighting of the BMS to stay on longer than they normally do or to otherwise be on when they would be off.

As for device implemented interventions, in one example, a controller of the BMS may provide an input to override points if the controller determines that there is an issue with another point of the BMS. For example, the controller may determine that the pressure in a building is too high and consequently open up vents of the BMS to lower the pressure. In another example, the controller may determine that too much energy is being consumed by the BMS and provide an input to lower the amount of energy that various building equipment consumes while operating. In another example, the controller may determine that the zone air temperature of a room of the BMS is too cold and provide an input to increase the zone air temperature of the room. Devices may provide inputs for interventions for any point of the BMS.

Process 1200 is shown to include evaluating the first input to determine how the intervention will affect a variable of the BMS (step 1208). For example, step 1208 may be performed by any combination of external loading model 514, internal loading model 516, uninterrupted control model 518, and interrupted control model 520. The variable may be a point or any other variable of the building system such as, but not limited to, energy consumption, comfortability, discharge air temperature, humidity, pressure, etc. Upon receiving the first input, current and/or predicted building data may be provided to machine learning models such as, but not limited to, external loading model 514, internal loading model 516, uninterrupted control model 518, and/or interrupted control model 520. The building data may be timeseries data indicating how the BMS has recently been operating and/or predicted timeseries data indicating how the BMS is predicted to operate in the future. Evaluating the first input may include the machine learning models evaluating individual values and combinations of individual values of the current and/or predicted building data to determine the impact that implementing the intervention may have on the variable.

For example, the machine learning models may cooperate to predict the impact that changing a cooling coil valve position from its normal position (e.g., changing the coil cooling coil valve position from 50% to 100% open) (i.e., implementing an intervention of a point) may have on the discharge air temperature (i.e., a variable) of a BMS over time. Further, the machine learning models may determine the impact on the comfortability and the total energy consumption of the BMS of the cooling coil valve that the intervention may have. The machine learning models may evaluate the impact of the intervention for time-steps into the future. Continuing with the example above, the machine learning models may determine discharge air temperature values, comfortability scores, and energy consumption values for 10 consecutive hours based on the user changing the cooling coil valve position from its normal position. The machine learning models may also determine values for the same points or variables for 10 consecutive hours if the user were not to change the cooling coil valve position from its normal position. Advantageously, by doing so, operators may view the determined values and decide whether to implement the intervention.

To perform the evaluations, machine learning models (e.g., external loading model 514, internal loading model 516) predict the heating load that is placed on the BMS from external disturbances and the equipment cooling load that is placed on the BMS from internal disturbances and, in some cases, external disturbances. Such machine learning models may do so based on predictive data that predicts the disturbances that will impact the BMS for consecutive time-steps into the future. For example, the machine learning models may receive weather forecast data from outside sources and/or modeling data from data from internal sources that predict potential impacts to how the BMS operates. Additionally, the machine learning models may receive equipment configuration data such as pre-configured setpoints, valve positions, damper positions, etc., that may impact the equipment cooling load that will be placed on the BMS at set points in time. Based on this data, the machine learning models may determine the heat loads and/or equipment cooling loads and provide the determinations to other machine learning models to determine the impact that a change in a point may have on the variable of the BMS.

The other machine learning models may receive the output heat loads and/or equipment cooling loads and use the outputs in addition to other building data to evaluate the impact that the intervention may have on the variable and, in some cases, other variables of the BMS such as energy consumption and the comfortability. For example, an operator may wish to change the humidity of a room because it is too stuffy. To do so, the operator may provide an input to open a damper in the room to allow more air to circulate throughout the room. Upon receiving the input, machine learning models may determine the heating load and equipment cooling load that may be placed on the BMS over a 12 hour time period, in some cases regardless of whether the damper is opened. These loads may be provided as inputs to further machine learning models, which can determine how opening the damper would impact the energy consumption of the BMS, the comfortability of the BMS or space, and/or the zone air temperature of the space of the BMS over time. The machine learning models may determine values for each of these points or variables based on the intervention being implemented and the intervention not being implemented so an operator or control system may more easily determine whether implementing such a change would be desirable.

In some embodiments, the output of the machine learning models that predict values of the variable for various time-steps if the intervention is implemented or if the intervention is not implemented may include confidence scores. The confidence scores may indicate a degree of confidence that the machine learning model has that the predicted value for the variable is correct for a given time-step. For example, a machine learning model may predict that there is a 90 percent chance that the zone air temperature for a room will be 65 degrees at 2 PM if the zone air temperature setpoint for the room is set to 62 degrees at 12 PM. The confidence score may be compared to a threshold, as determined by an administrator, and, if the confidence score exceeds the threshold, the predicted value may be selected. Otherwise, an indication may be sent to the user interface indicating that a value could not be predicted. In some embodiments, the machine learning models predict probabilities for multiple values of a time-step. Continuing with the example above, the machine learning model may also predict that there is a 10 percent chance that the zone air temperature for the room will be 66 degrees at 2 PM. The probabilities for the two values may be compared and the value that is associated with the highest probability may be selected as being associated with the time-step. In some embodiments, to confirm that the machine learning model predicts a value with enough confidence, the highest confidence score may be compared to a threshold.

Process 1200 is shown to include predicting a time at which the intervention will affect the variable of the BMS (step 1210). For example, step 1210 may be performed by model output aggregator 522, BMS controller 366, or any other data processing system. Predicting the time at which the intervention will affect the variable of the BMS may include determining a time at which the intervention will cause a value of the variable to be within the range of acceptable values of the variable. The range of acceptable values of the variable may be pre-configured by an administrator. For example, an administrator may input that a range of acceptable values for a zone air temperature of a room is between 68 degrees and 72 degrees. In another example, an administrator may input that a range of acceptable values for the energy consumption of a BMS is between 13 kWh and 15 kWh. In another example, an administrator may input that a range of acceptable values for a discharge air temperature is between 65 degrees and 70 degrees. Ranges of acceptable values may be obtained and stored. Administrators may configure the BMS to have any range of acceptable values for any point or variable.

The time in which an intervention may affect the variable of BMS may be the predicted time in which values of the variable may enter or leave the range of acceptable values based on the output of the machine learning model that predicts the impact an intervention may have on the variable. Each output time-step of the machine learning model may be compared the range of acceptable values for the variable. The earliest time-step in which the variable would enter the range of acceptable values may be the predicted time in which the intervention affects the variable. The first time-step in which the variable leaves the range of acceptable values if the intervention were to be implemented may also be identified. Consequently, a time period may be identified in which the variable may be within the range of acceptable values.

Process 1200 is shown to include presenting feedback to a user via a user interface before implementing the intervention of the point (step 1212). The feedback may be shown to the user in a user interface on a user device. The feedback may include information indicating whether the intervention should be implemented, whether the intervention should only be executed for a time frame that results in desired results, and/or whether to execute the intervention without providing a time frame. For example, as shown in FIG. 11, the user interface may include multiple graphs indicating values of the variable that would be affected by an intervention of the point. The user interface may illustrate a comparison of values of the variable if the intervention were to be implemented and values of the variable if the intervention were not to be implemented. The user interface may also illustrate a cost savings (e.g., a decrease in energy consumption if the intervention were implemented) and comfortability scores if the intervention were to be implemented so a user can more easily do an analysis on whether saving costs (e.g., lowering energy consumption values) or comfort is more important and whether a balance could be found between the two by limiting the intervention to a specific time range.

Time ranges in which a variable reaches desirable values may be noted on the user interface. For example, as illustrated in user interface 1100 of FIG. 11, there may be specific ranges of values for the variable that may be desirable to the operator of the BMS. When displaying the predicted impact that an intervention of the point may have, the times in which the values of the variable may enter and/or leave the desirable range of values of the variable may be indicated on the user interface. In some embodiments, times in which values of the variable enter and/or leave the desirable range of values for the variable if the intervention were not implemented may also be illustrated in the same graph. Similar time ranges may be illustrated on the user interface related to the predicted comfortability of occupants of the BMS over time if the intervention were to be implemented and/or predicted energy savings over time if the intervention were to be implemented.

In some embodiments, the user interface may also provide operators with the ability to implement an intervention and, in some cases, time periods in which the interventions should be implemented. Advantageously, by providing operators with such an opportunity in addition to illustrating the impact that implementing an intervention may have over time, operators may determine whether to implement an intervention based on the predicted impact that the intervention would have on the shown variable, any energy savings that implementations may cause, and how the intervention may affect the comfortability of the BMS over time. The operators may view this data and implement interventions for various time periods as provided by the user interface.

Process 1200 is shown to include implementing the intervention or a cancellation of the intervention based at least in part on a second input or an automated response to the feedback (step 1214). For example, step 1214 may be performed by BMS controller 366 or intervention prediction system 502. The second input may be an input that the user makes on the interface. The automated response may similarly be determined based on the predicted impact of the intervention. The second input or the automated response may be to implement the intervention or a cancellation of the intervention. The second input or the automated response may also be to implement the intervention for a set time period into the future. For example, a user may view the predicted effects that changing the setpoint of a room will cause over a 12 hour time period between noon and midnight on a user interface. Based on the predicted effects, the user may determine to implement the intervention between 1 PM and 5 PM. Via the user interface, the user may select this time period to cause the intervention to go into effect. BMS controller 366 may receive this indication and change the temperature setpoint of the room from its normal setpoint between 1 PM and 5 PM and then cause the setpoint to return to its normal value after 5 PM.

In another example, a user may be planning to host a party after 9 PM in a building. Normally, the lights of the building are configured to be shut off after 9 PM. However, the user may provide an input to a user interface on a user device to cause the lights to stay on after 9 PM. Comfortability scores and/or energy consumption values may be determined based on the intervention being implemented and not being implemented. The user may view such values on the user interface and determine to cause the lights to stay on between 9 PM and 12 PM. The user may provide an input to implement the intervention for the determined time frame. In another example, a building controller may determine that the energy consumption of a building is too high based on a series of rules with which the building controller is configured. The building controller may provide an input to cause the chiller to use less power. The comfortability and the zone air temperature of the space may be determined based on the intervention being put into place. The building controller may review this data and determine that the building may get too hot if the intervention were implemented and consequently cancel the proposed intervention. In some instances, the building controller may then seek other changes that may be made to the operation of the building to lower its energy consumption. Interventions to any point of buildings or BMS may be proposed and evaluated before they are ultimately implemented.

Advantageously, the systems and methods described herein can be implemented to minimize the unintended negative effects that interventions into how a BMS normally operates may have on the BMS. The systems and methods may provide multiple machine learning models that, when used in combination, may determine the effects an intervention of one point may have on various other points or variables of the BMS. Data generated by the machine learning models may be used to automatically determine whether to implement input interrupts. The data may also be displayed via a user interface that displays a comparison between the BMS may operate if the intervention were to be implemented and if the intervention were not to be implemented. The data may show the impact of the intervention over time. Both operators and the BMS may review such data and determine whether to implement the intervention and, if it determines to implement the intervention, a time frame in which the intervention should be implemented.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of predicting a time of effect of an intervention of a point of a Building Management System (BMS), the method comprising:
  receiving, from a user interface, an input request for an intervention of a point of the BMS, the intervention changing a setpoint of the point from a first value to a second value;
  predicting a time period in which the intervention will cause a variable of the BMS to be within a predetermined range;
  presenting feedback via the user interface before implementing the intervention of the point, the feedback comprising the time period in which the intervention will cause the variable to be within the predetermined range; and
  using an electronic processor, implementing the intervention based at least in part on an input from the user or an automated response to the feedback by:
    changing, using the electronic processor, the setpoint of the point from the first value to the second value;

responsive to the change, changing, using the electronic processor, operation of building equipment of the BMS according to the changed setpoint;

reverting, using the electronic processor, the setpoint to the first value within the predicted time period; and responsive to the reversion, changing, using the electronic processor, the operation of the building equipment according to the reverted setpoint.

2. The method of claim 1, wherein predicting the time period in which the intervention will cause the variable of the BMS to be within the predetermined range comprises determining a first time at which the intervention will cause a third value of the variable to reach the predetermined range.

3. The method of claim 2, further comprising:

wherein predicting the time period in which the intervention will cause the variable of the BMS to be within the predetermined range comprises determining a second time at which the intervention will cause a fourth value of the variable to leave the predetermined range.

4. The method of claim 1, wherein predicting the time period in which the intervention will cause the variable of the BMS to be within the predetermined range comprises:

obtaining live BMS data associated with operation of the BMS;

providing the live BMS data to one or more machine learning models;

obtaining a confidence score for a value for the variable for a first time within the time period by executing the one or more machine learning models using the live BMS data, the confidence score indicating a degree of confidence that the value is correct for the first time; and predicting the time period based on the confidence score.

5. The method of claim 4, further comprising:

generating a training dataset using historical data associated with the BMS, the training dataset comprising timeseries with an output indicating a second time that a second intervention will affect the variable; and training the one or more machine learning models using the training dataset.

6. The method of claim 4, wherein the one or more machine learning models comprise at least one of:

a first machine learning model for predicting control system data if there is not an intervention; or a second machine learning model for predicting the control system data if there is an intervention, wherein predicting the time period in which the intervention will cause the variable to be within the predetermined range is based on an output from the second machine learning model.

7. The method of claim 6, wherein the one or more machine learning models further comprise at least one of:

a third machine learning model for predicting an effect that external loading disturbances will have on the BMS; or a fourth machine learning model for predicting an effect that internal loading disturbances will have on the BMS, wherein the at least one of the third machine learning model or the fourth machine learning model provide outputs to the at least one of the first machine learning model or the second machine learning model.

8. The method of claim 1, wherein the variable is a comfortability of the BMS or an energy or cost savings of the BMS.

9. The method of claim 1, further comprising:

concurrently presenting, on the user interface, first values of the variable over time if the user does not input the intervention and second values of the variable over time if the user does input the intervention.

10. The method of claim 1, wherein the variable is an energy consumption, a zone air temperature, a zone humidity, or a discharge air temperature.

11. The method of claim 1, wherein the point is a supply vent state, a supply fan state, a discharge air temperature setpoint, a zone air temperature setpoint, a ductwork damper state, or a cooling coil valve position.

12. A system comprising one or more memory devices storing instructions thereon that, when executed by one or more processors, cause the one or more processors to:

receive a first input related to an intervention of a point, the intervention changing a setpoint of the point from a first value to a second value;

predict a time period in which the intervention will cause a variable of the system to be within a predetermined range; and implement the intervention the intervention based at least in part on the time period by:

changing the setpoint of the point from the first value to the second value;

responsive to the change, changing operation of building equipment of the BMS according to the changed setpoint;

reverting the setpoint to the first value within the predicted time period; and responsive to the reversion, changing the operation of the building equipment according to the reverted setpoint.

13. The system of claim 12, wherein the instructions cause the one or more processors to predict the time period in which the intervention will cause the variable of the system to be within the predetermined range by determining a first time at which the intervention will cause a third value of the variable to reach the predetermined range.

14. The system of claim 13, wherein the instructions cause the one or more processors to predict the time period in which the intervention will cause the variable of the system to be within the predetermined range by determining a second time at which the intervention will cause a fourth value of the variable to leave the predetermined range.

15. The system of claim 12, wherein the instructions cause the one or more processors to predict the time period in which the intervention will cause the variable of the system to be within the predetermined range by:

obtaining live system data associated with operation of the system;

providing the live system data to one or more machine learning models;

obtaining a confidence score for a value for the variable for a first time within the time period by executing the one or more machine learning models using the live system data, the confidence score indicating a degree of confidence that the value is correct for the first time; and predicting the time period based on the confidence score.

16. The method of claim 15, wherein the instructions cause the one or more processors to further:

generate a training dataset using historical data associated with the BMS, the training dataset comprising timeseries with an output indicating a second time at which a second intervention will affect the variable; and train the one or more machine learning models using the training dataset.

17. A method for predicting a time of effect of an intervention of a point of a Building Management System (BMS), the method comprising:
predicting a time period in which an intervention of a point will cause a value of a variable to be to be within a predetermined range, the intervention changing a setpoint of the point from a first value to a second value;
presenting feedback via a user interface before implementing the intervention of the point, the feedback comprising the time period in which the intervention will cause the variable to be within the predetermined range; and
using an electronic processor, implementing the intervention or a modification of the intervention based at least in part on an input from the user or an automated response to the feedback by:
changing, by the electronic processor, the setpoint of the point from the first value to the second value;
responsive to the change, changing, by the electronic processor, operation of building equipment of the BMS according to the changed setpoint;
reverting, using the electronic processor, the setpoint to the first value within the predicted time period; and
responsive to the reversion, changing, using the electronic processor, the operation of the building equipment according to the reverted setpoint.

18. The method of claim 17, wherein predicting the time period in which the intervention will cause the variable of the BMS to be within the predetermined range comprises:
obtaining live BMS data associated with operation of the BMS;
providing the live BMS data to one or more machine learning models;
obtaining a confidence score for a value for the variable for a first time within the time period by executing the one or more machine learning models using the live BMS data, the confidence score indicating a degree of confidence that the value is correct for the first time; and
predicting the time period based on the confidence score.

19. The method of claim 18, wherein the one or more machine learning models comprise at least one selected of:
a first machine learning model for predicting control system data if there is not an intervention; or
a second machine learning model for predicting control system data if there is an intervention,
wherein predicting a time period in which the intervention will cause the variable of the BMS to be within the predetermined range is based on an output from the second machine learning model.

20. The method of claim 1, wherein the time period begins at a first time and ends at a second time,
wherein changing the setpoint of the point from the first value to the second value comprises changing, using the electronic processor, the setpoint prior to the first time; and
wherein reverting the setpoint to the first value within the predicted time period comprises reverting, using the electronic processor, the setpoint to the first value prior to the second time.

* * * * *